(12) United States Patent
Kondo

(10) Patent No.: US 7,516,107 B2
(45) Date of Patent: Apr. 7, 2009

(54) SIGNAL PROCESSING DEVICE

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 545 days.

(21) Appl. No.: 10/258,099

(22) PCT Filed: Feb. 21, 2002

(86) PCT No.: PCT/JP02/01541

§ 371 (c)(1),
(2), (4) Date: Oct. 18, 2002

(87) PCT Pub. No.: WO02/067192

PCT Pub. Date: Aug. 29, 2002

(65) Prior Publication Data

US 2003/0142837 A1  Jul. 31, 2003

(30) Foreign Application Priority Data

Feb. 21, 2001 (JP) ............................... 2001-45249

(51) Int. Cl.
*G06N 5/00* (2006.01)
(52) U.S. Cl. ............................ 706/12; 706/45
(58) Field of Classification Search .................... 706/12, 706/23, 25, 22; 455/13.4, 9; 330/51; 345/418; 381/317, 315; 360/75
See application file for complete search history.

(56) References Cited

U.S. PATENT DOCUMENTS

| 4,228,538 A | * | 10/1980 | Scharla-Nielsen et al. ..... 455/9 |
| 4,261,054 A | * | 4/1981 | Scharla-Nielsen ......... 455/13.4 |
| 5,303,306 A | * | 4/1994 | Brillhart et al. ............. 381/315 |
| 5,412,735 A | * | 5/1995 | Engebretson et al. ....... 381/317 |
| 5,796,609 A | * | 8/1998 | Tao et al. ..................... 700/44 |
| 6,259,824 B1 | | 7/2001 | Sekiya |
| 6,342,810 B1 | * | 1/2002 | Wright et al. ................. 330/51 |

FOREIGN PATENT DOCUMENTS

| EP | 1 001 371 | 5/2000 |
| EP | 1 001 372 | 5/2000 |
| EP | 1 001 373 | 5/2000 |
| JP | 5-80626 | 4/1993 |
| JP | 5 149602 | 6/1993 |
| JP | 6 161982 | 6/1994 |
| JP | 6 214523 | 8/1994 |
| JP | 11 176272 | 7/1999 |
| JP | 2000-151434 | 5/2000 |

* cited by examiner

*Primary Examiner*—Wilbert L Starks, Jr.
(74) *Attorney, Agent, or Firm*—Frommer Lawrence & Haug LLP; William S. Frommer; Paul A. Levy

(57) ABSTRACT

The present invention relates to a signal processing device which learns operations made by a user without the user knowing, and which can perform processing optimal to the user based on the learning results. At a learning unit 2, operating signals supplied according to user operations are monitored, and judgment is made whether or not these can be used for learning. In the event that the operating signals are learning operating signals which can be used for learning, the learning unit 2 learns a correction norm which is the norm for correcting input signals, based on the learning operating signals. On the other hand, at a correcting unit 1, post-correction signals, wherein the input signals are corrected based on the correction norm obtained by learning, are output as output signals. The present invention can be applied to an NR (Noise Reduction) circuit which removes noise.

25 Claims, 20 Drawing Sheets

REGRESSION LINE

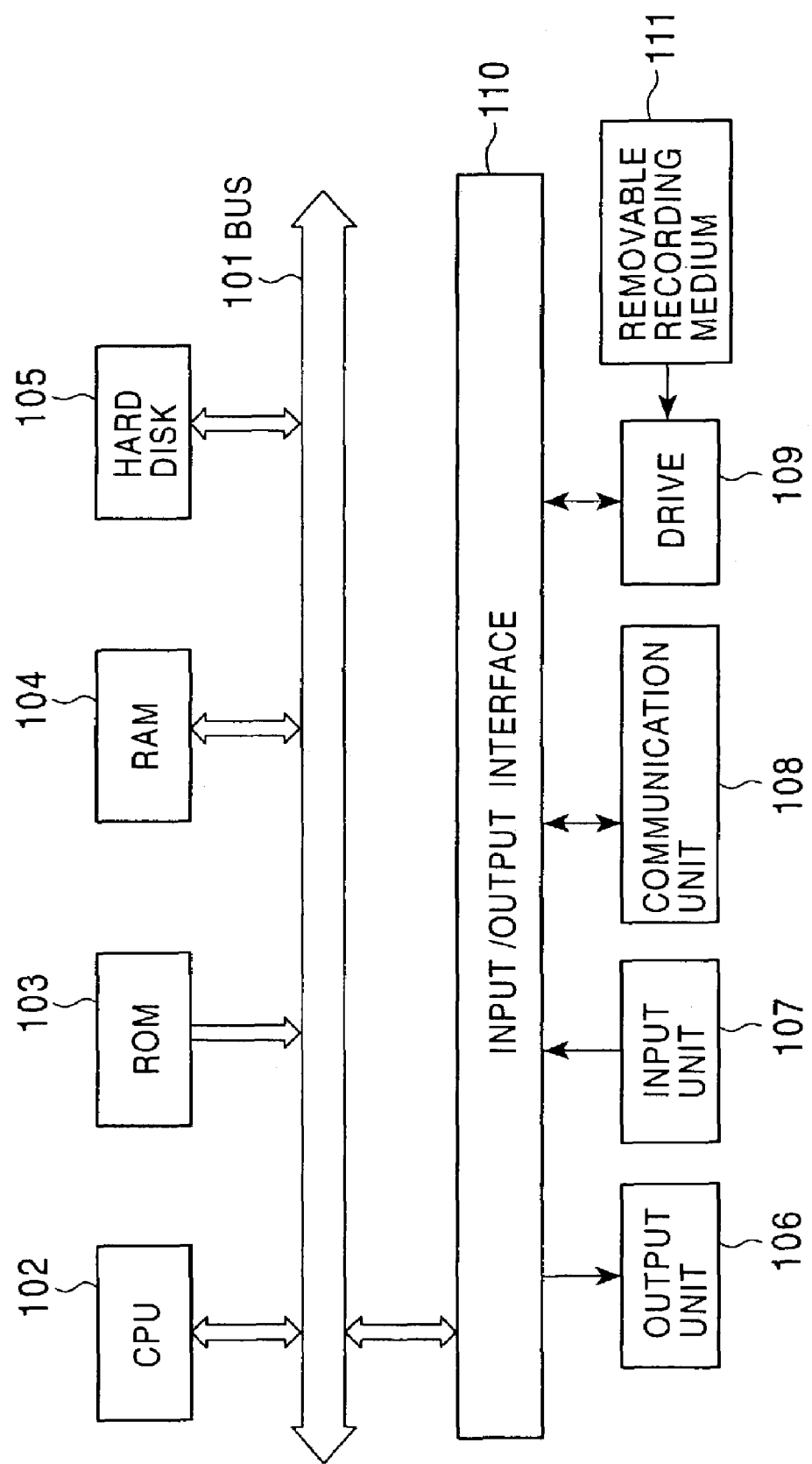

SIGNAL PROCESSING DEVICE

TECHNICAL FIELD

The present invention relates to a signal processing device, and particularly relates to a signal processing device which, for example, learns operations of the user without the user knowing, so as to perform optimal processing for the user.

BACKGROUND ART

For example, with conventional NR (Noise Reduction) circuits, in the event that a user operates an adjustment knob thereof and sets it at a certain position, noise removal processing corresponding to the position of the knob is performed.

Now, the S/N (Signal to Noise Ratio) and frequency properties and the like of signals input to the NR circuit are not necessarily always constant, rather, it is common for these to change. In the event that the S/N, frequency properties, etc., of the signals input to the NR circuit change, suitable processing is not necessarily performed with regard to the signals input to the NR circuit in the noise removal processing corresponding to the position where the user has set the knob, and accordingly, the user needs to frequently operate the knob so that suitable noise removal processing is performed for him/herself, which has been troublesome.

DISCLOSURE OF INVENTION

The present invention has been made in light of such, and accordingly, it is an object thereof to learn operations of the user without the user knowing, so as to perform optimal processing for the user.

The signal processing device according to the present invention comprises: judging means for monitoring operating signals supplied according to user operations, and judging whether or not the signals are usable for learning; learning means for learning a correction norm which is a norm for correcting the input signals, based on learning operating signals which are the operating signals which can be used for learning; and correcting means for correcting the input signals based on the correction norm obtained from the learning and outputting signals following the correction as the output signals.

The signal processing method according to the present invention comprises: a judging step for monitoring operating signals supplied according to user operations, and judging whether or not the signals are usable for learning; a learning step for learning a correction norm which is a norm for correcting the input signals, based on learning operating signals which are the operating signals which can be used for learning; and a correcting step for correcting the input signals based on the correction norm obtained from the learning and outputting signals following the correction as the output signals.

The program according to the present invention comprises: a judging step for monitoring operating signals supplied according to user operations, and judging whether or not the signals are usable for learning; a learning step for learning a correction norm which is a norm for correcting the input signals, based on learning operating signals which are the operating signals which can be used for learning; and a correcting step for correcting the input signals based on the correction norm obtained from the learning and outputting signals following the correction as the output signals.

The recording medium according to the present invention stores a program comprising: a judging step for monitoring operating signals supplied according to user operations, and judging whether or not the signals are usable for learning; a learning step for learning a correction norm which is a norm for correcting the input signals, based on learning operating signals which are the operating signals which can be used for learning; and a correcting step for correcting the input signals based on the correction norm obtained from the learning and outputting signals following the correction as the output signals.

With the signal processing device and signal processing method, and program and recording medium, according to the present invention, operating signals supplied according to user operations are monitored, judgment is made regarding whether or not the signals are usable for learning, and a correction norm which is a norm for correcting the input signals is learned, based on learning operating signals which are the operating signals which can be used for learning. The input signals are then corrected based on the correction norm obtained from learning, and signals following correction are output as output signals.

BRIEF DESCRIPTION OF THE DRAWINGS

FIG. 21 is a block diagram illustrating a configuration example of an embodiment of a computer to which the present invention has been applied.

BEST MODE FOR CARRYING OUT THE INVENTION

Figure 1:
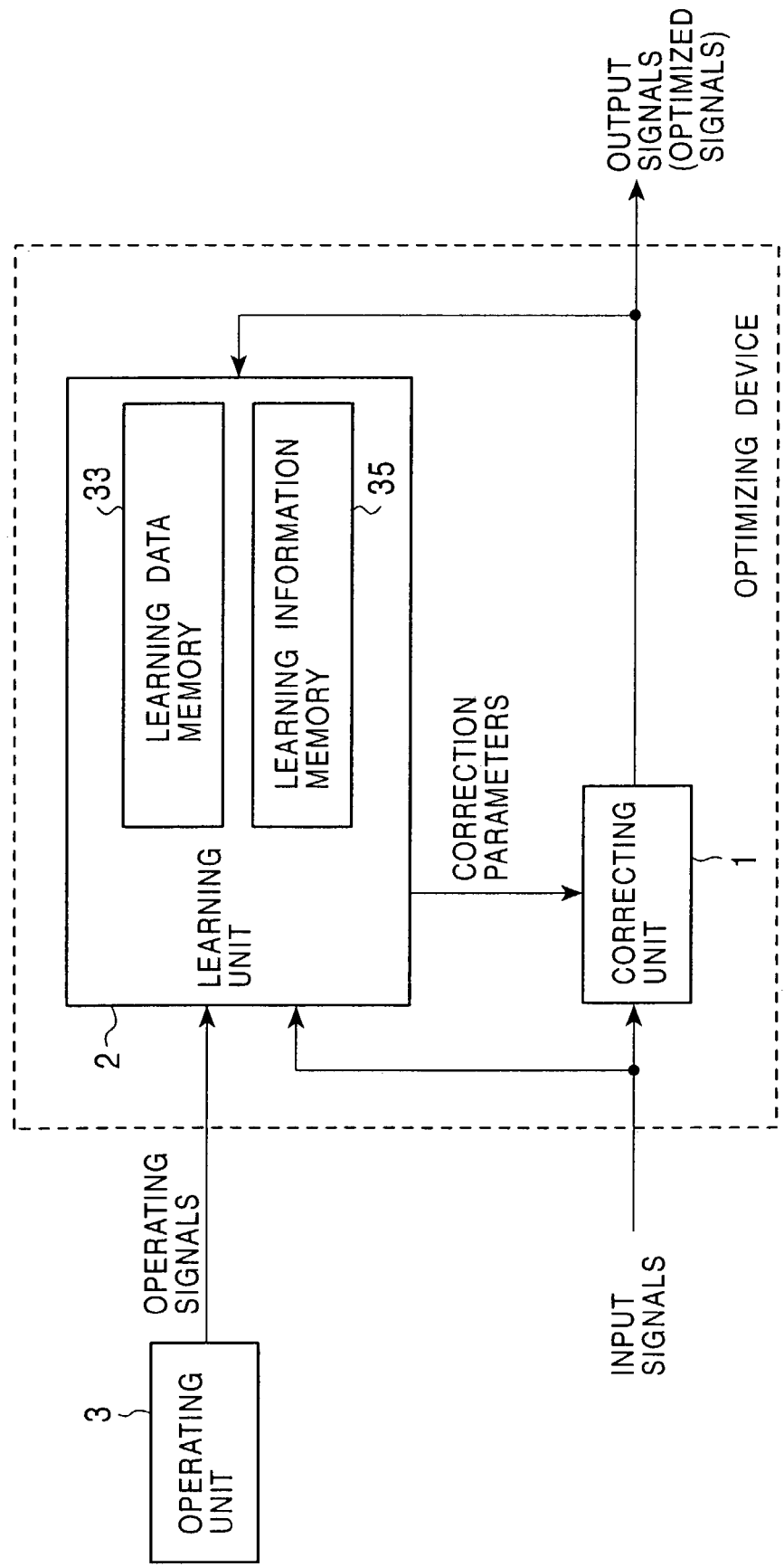
FIG. 1 is a block diagram illustrating a configuration example of an embodiment of an optimizing device to which the present invention has been applied.

FIG. 1 illustrates a configuration example of an embodiment of an optimizing device to which the present invention has been applied.

With this optimizing device, processing which is optimal for the user is performed by learning the operations of the user without the user knowing. That is, with the optimizing device, operating signals supplied corresponding to operations of the user are monitored, and judgment is passed regarding whether or not these can be used for learning. In the event that the operating signals are learning operating signals which can be used for learning, a correction norm which is the norm for correcting the input signals is learned, based on the learning operating signals. On the other hand, input signals are corrected based on the correction norm obtained by learning, and signals following the correction are output as output signals.

An optimizing device is configured of a correcting unit 1 and a learning unit 2, to which are supplied operating signals corresponding to user operations, besides input signals which are subject to processing.

The operating signals are supplied from operating unit 3. That is, the operating unit 3 is configured of, for example, rotary or slide knobs, switches, pointing devices, etc., and operating signals corresponding to user operations are supplied to the optimizing device.

Digital input signals, for example, are supplied to the correcting unit 1 making up the optimizing device, as well as, for example, correction parameters serving as correction norm for correcting input signals, from the learning unit 2. The correcting unit 1 corrects input signals based on the correction parameters, and outputs signals following the correction, as output signals.

As well as operating signals from the operating unit 3 being supplied to the learning unit 2, input signals or output signals are also supplied thereto, as necessary. The learning unit 2 monitors the operating signals, and judges whether or not these can be used for learning. In the event that the operating signals are learning operating signals which can be used for learning, the learning unit 2 learns correction parameters used for correcting input signals using the input signals or the output signals based on the learning operating signals, as necessary, and supplies these to the correcting unit 1.

Note that the learning unit 2 has built-in learning data memory 33 and learning information memory 35, wherein the learning data memory 33 stores learning data used for learning, and the learning information memory 35 stores later-described learning information obtained by learning.

Figure 2:
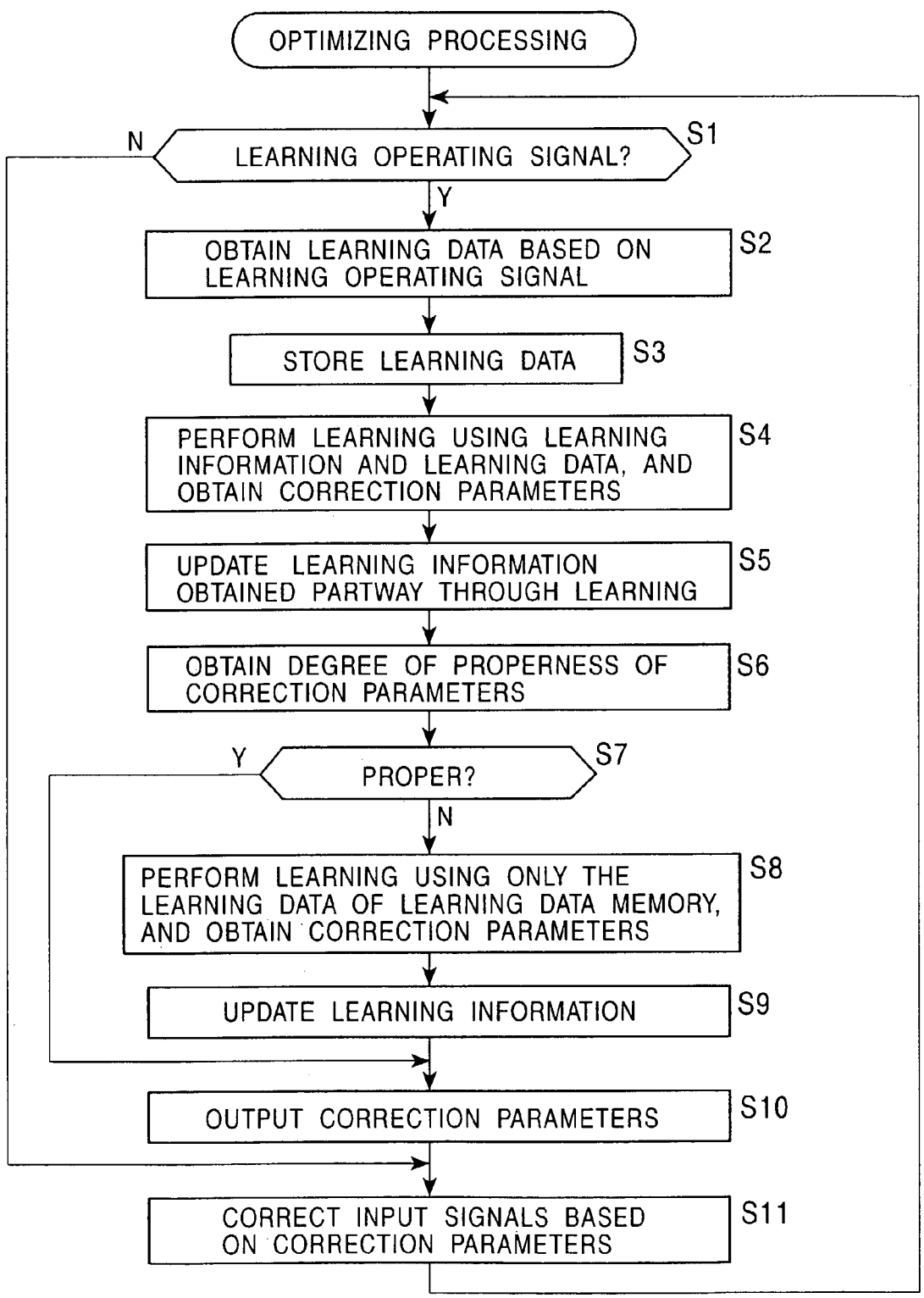
FIG. 2 is a flowchart describing optimizing processing with an optimizing device.

Next, the processing (optimizing processing) which the optimizing device shown in FIG. 1 performs, will be described with reference to the flowchart shown in FIG. 2.

First, in step S1, the learning unit 2 judges whether or not learning operating signals have been received from operating unit 3. Here, in the event of operating the operating unit 3, usually, the user first performs general operations, and then performs detailed operations while confirming the output signals output according to the operations, and then stops operations at the point that output signals which the user thinks are ultimately optimal are obtained. The operating signals corresponding to the position of the operating unit 3 at the point where output signals which the user thinks are optimal are obtained are the learning operating signals, and accordingly, in the event that the operating unit 3 is operated for a predetermined amount of time or longer and then the operating is stopped, the learning unit 2 judges the operating signals at the time of stopping as being learning operating signals.

In step S1, in the event that judgement is made that learning operating signals are not received, i.e., in the event that the user has not operated the operating unit 3, or has operated but is still looking for an optimal position, for example, step S2 through step S10 are skipped, the flow proceeds to step S11, and the correcting unit 1 corrects the input signals according to the correction parameters already set, output signals are output as the correction results, and the flow returns to step S1.

Also, in step S1, in the event that judgement is made that learning operating signals have been received, the flow proceeds to step S2, the learning unit 2 obtains learning data used for learning, based on the learning operating signals, and the flow proceeds to step S3. In step S3, the learning data memory 33 stores the newest learning data obtained in step S2.

Here, the learning data memory 33 has storage capacity capable of storing multiple sets of learning data. Also, in the event that this storage capacity is filled up, the learning data memory 33 is arranged so as to overwrite the oldest stored values with the next learning data. Accordingly, there are multiple sets of learning data in the learning data memory 33, with the newest stored.

Following storing of the learning data in the learning data memory 33 in step S3, the flow proceeds to step S4, where the learning unit 2 performs learning using the newest learning data stored in the learning data memory 33 and the learning information stored in the learning information memory 35, obtains correction parameters, and proceeds to step S5. In step S5, the learning unit 2 updates the stored contents of the learning information memory 35 with new learning information obtained part way through the learning in step S4, and the flow proceeds to step S6.

In step S6, the learning unit 2 obtains a later-described properness which represents the properness of the correction parameters obtained in step S4, the flow proceeds to step S7, and judgment is made regarding whether or not the correction parameters obtained in step S4 are proper, based on the properness.

In the event that judgement is made in step S7 that the correction parameters are proper, steps S8 and S9 are skipped, the flow proceeds to step S10, and a learning unit 2 outputs the correction parameters judged to be proper to the correcting unit 1, and the flow proceeds to step S11. Accordingly, in this case, subsequent input signal correction is performed at the correcting unit 1 following the correction parameters newly obtained by the learning in step S4.

On the other hand, in the event that judgment is made in step S7 that the correction parameters are not proper, the flow proceeds to step S8, the learning unit 2 performs learning using only the newest learning data of the learning data stored in the learning data memory 33, obtains correction parameters, and proceeds to step S9. In step S9, the learning unit 2 updates the stored contents of the learning information memory 35 with the new learning information obtained part way through the learning in step S8, and the flow proceeds to step S10. In this case, in step S10, the learning unit 2 outputs the correction parameters obtained only from the newest learning data in step S8 to the correcting unit 1, and the flow proceeds to step S11. Accordingly, in this case, subsequent input signal correction is performed at the correcting unit 1 following the correction parameters newly obtained by the learning in step S8.

Figure 3:
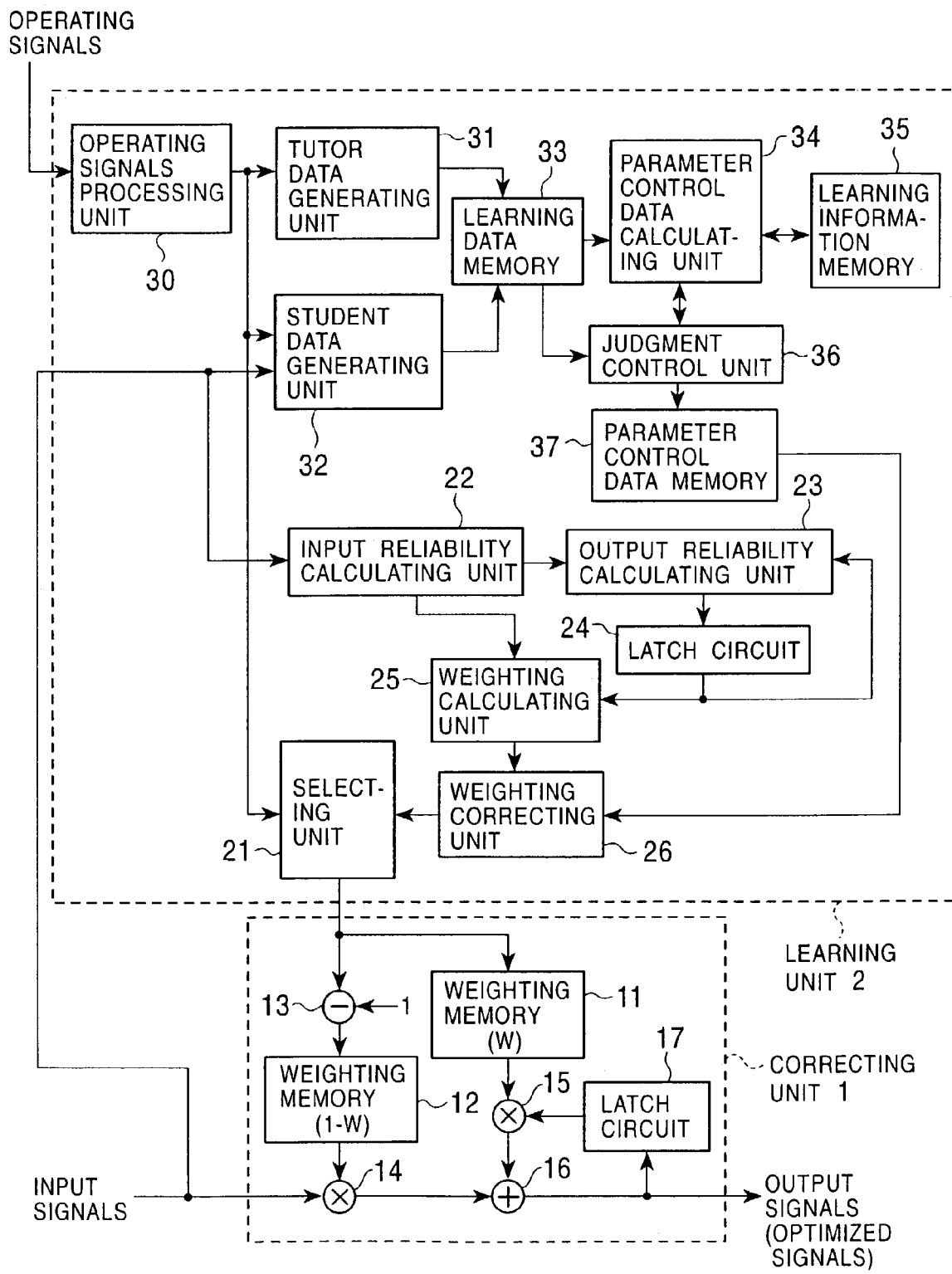
FIG. 3 is a block diagram illustrating a configuration example of an embodiment of an NR circuit using an optimizing device.

Next, FIG. 3 illustrates a detailed configuration example of a case wherein the optimizing device shown in FIG. 1 is applied to an NR circuit which removes noise from image signals and audio signals, for example.

Weighting memory 11 stores a weight (coefficient) w (e.g., a value that is 0 or greater but 1 or smaller) as correction parameters supplied from a later-described selecting unit 21 of the learning unit 2. The weight memory 12 stores weight 1−W supplied from the computing unit 13.

The computing unit 13 supplies the subtracted value wherein the weight W supplied from the selecting unit 21 of the learning unit 2 is subtracted from 1.0, which is supplied to the weighting memory 12 as weight. The computing unit 14 multiplies the input signals and the weight 1−W stored in the weighting memory 12, and supplies the multiplied value to a computing unit 16. A computing unit 15 multiplies the weight W stored in the weight memory 11 and the output signals stored (latched) at the latch circuit 17, and supplies the multiplied value thereof to the computing unit 16. The computing unit 16 adds the outputs of the computing units 14 and 15, and outputs the added value thereof as output signals.

A latch circuit 17 latches on the output signals which the computing unit 16 outputs, and supplies these to the computing unit 15.

With the embodiment shown in FIG. 3, the correcting unit 1 is configured of the above weighting memory 11 and 12, computing units 13, 14, 15, and 16, and the latch circuit 17.

This selecting unit 21 selects one or the other of the weight output by the weight correcting unit 26 or the weight output by the operating signal processing unit 30, and supplies this to the correcting unit 1 as correction parameters.

The input reliability calculating unit 22 is arranged so as to be supplied with input signals, and obtains the input reliability which represents the reliability of the input signals thereof, which are output to the output reliability calculating unit 23 and the weighting calculating unit 25. The output reliability calculating unit 23 obtains output reliability representing the reliability of the output signals, based on the input reliability from the input reliability computing unit 22, and supplies this to the latch circuit 24 and the weighting calculating unit 25. The latch circuit 24 stores (latches) the output reliability from the output reliability computing unit 23, and supplies this to the output reliability calculating unit 23 and the weighting calculating unit 25.

The weighting calculating unit 25 calculates the weighting from the input reliability from the input reliability calculating unit 22 and the output reliability from the output reliability calculating unit 23, and outputs this to the weighting correcting unit 26. The weighting correcting unit 26 is arranged so as to be supplied from parameter control data memory 37 with parameter control data which controls the weighting serving as correction parameters, in addition to weight, and the weighting correcting unit 26 processes (corrects) the weighting with the parameter control data, and supplies this to the selecting unit 21.

An operating signal processing unit 30 is arranged so as to be supplied with operating signals from the operating unit 3 (FIG. 1), with the operating signal processing unit 30 processing the operating signals supplied thereto, and supplying the weight corresponding to the operating signals thereof to the selecting unit 21, a tutor data generating unit 31, and a student data generating unit 32. Further, the operating signal processing unit 30 judges whether or not the operating signals are the above-described learning operating signals, and in the event that the operating signals are learning operating signals, a flag to that effect (hereafter may be referred to as learning flag) is added to the weight to be output.

Upon receiving the weight with a learning flag added thereto from the operating signal processing unit 30, the tutor data generating unit 31 generates tutor data which serves as a tutor for learning, and supplies this to the learning data memory 33. That is, the tutor data generating unit 31 supplies the weight to which a learning flag has been added, to the learning data memory 33, as tutor data.

The students data generating unit 32, upon receiving the weight with the learning flag added from the operating signal processing unit 30, generates students data to serve as a student for learning, and supplies this to the learning data memory 33. That is, the student data generating unit 32 is configured in the same way as the above-described input reliability calculating unit 22, output reliability calculating unit 23, latch circuit 24, and weighting calculating unit 25, to calculate weighting from input signals supplied thereto, and supplying the weighting calculated from the input signals upon reception of weighting with a learning flag added thereto to the learning data memory 33, as student data.

The learning data memory 33 stores a set of tutor data serving as weighting corresponding to learning operating signals, supplied from the tutor data generating unit 31, and student data serving as weighting calculated from the input signals at the time of reception of the learning operating signals, supplied form the student data generating unit 32, as one set of learning data. As described above, the learning data memory 33 is capable of storing multiple sets of learning data, and further, upon storing learning data to the storage capacity, is arranged so as to store the next learning data by overwriting the oldest stored values. Accordingly, the learning data memory 33 basically has several of the newest learning data sets stored therein at all times.

A parameter control data calculating unit 34 learns the tutor data and student data serving as learning data stored in the learning data memory 33, as well as, if necessary, parameter control data which minimizes a predetermined statistical error by computing new learning information using the learning information stored in the learning information memory 35, under control of a judgment control unit 36, which is supplied to the judgment control unit 36. Also, the parameter control data calculating, unit 34 updates the stored contents of the learning information memory 35 with new learning information obtained by learning. The learning information memory 35 stores the learning information from the parameter control data calculating unit 34.

The judgment control unit 36 judges the properness of the parameter control data supplied from the parameter control data calculating unit 34, by making reference to the newest learning data stored in the learning data memory 33. Also, the judgment control unit 36 controls the parameter control data calculating unit 34 and supplies the parameter control data supplied from the parameter control data calculating unit 34, to the parameter control data memory 37. The parameter control data memory 37 updates the stored contents thereof by the parameter control data supplied from the judgment control unit 36, and supplies this to the weighting correcting unit 26.

With the embodiment shown in FIG. 3, the learning unit 2 is configured of the above-described selecting unit 21 through weighting correcting unit 26, and the operating signal processing unit 30 through parameter control data memory 37.

With an optimizing device serving as an NR circuit configured as described above, noise in input signals is removed as follows.

Figure 4A:
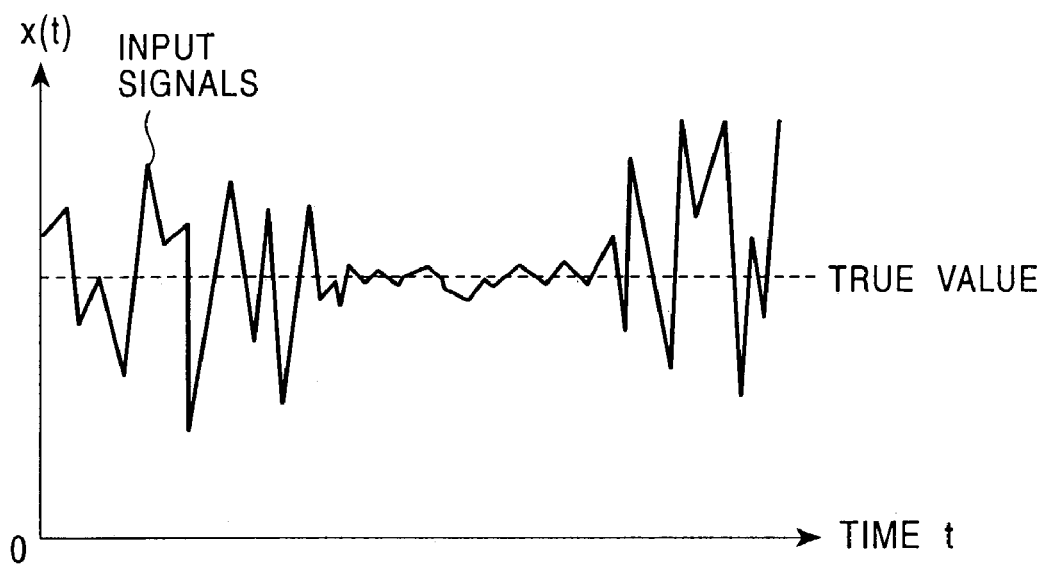
FIG. 4A is a waveform diagram representing input signals.

That is, for example, to simplify description, considering removing noise which fluctuates over time with regard to input signals having a constant true value upon which noise which fluctuates over time is superimposed, as shown in FIG. 4A, by taking the average thereof, noise can be effectively removed by making the weighting small (not giving much consideration) for input signals with a high noise level (i.e., signals with poor S/N), for example, as the degree of noise, while making the weighting great for input signals with a low noise level (i.e., signals with good S/N).

Figure 4B:
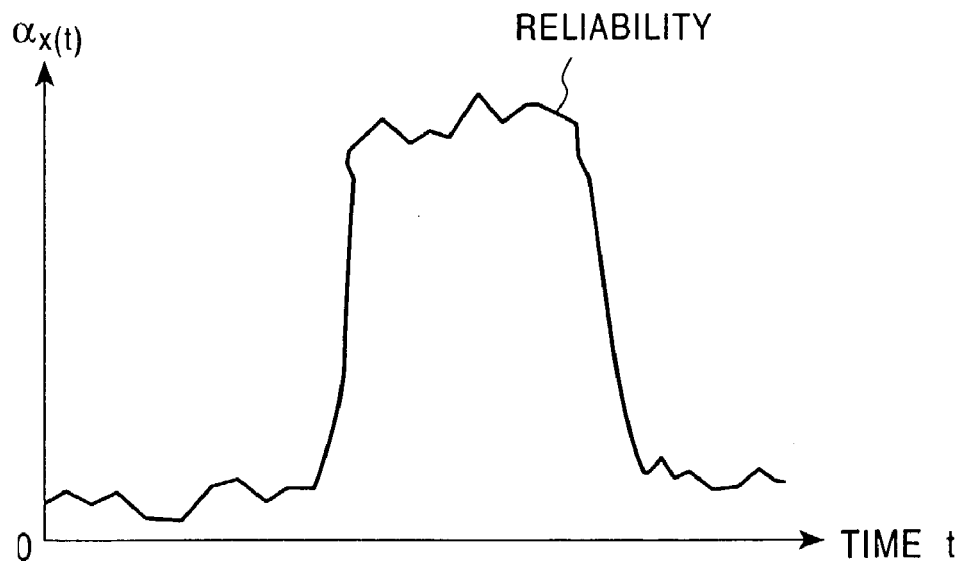
FIG. 4B is a waveform diagram representing input reliability.

Accordingly, with the NR circuit shown in FIG. 3, noise can be effectively removed by obtaining the closeness of the input signals to the true value as an evaluation value of input signals, as shown in FIG. 4B for example, i.e., the input reliability representing the reliability that the input signals are the true value, and calculating the average thereof by performing weighting corresponding to the input reliability for the input signals.

Accordingly, with the NR circuit shown in FIG. 3, the weight average using the weighting corresponding to the input reliability thereof is obtained with regard to the input signals, and output as output signals, and the output signals $y(t)$ can be obtained with the following Expression, wherein the input signals, the output signals, and input reliability, at time t, are represented by $x(t)$, $y(t)$, and $\alpha_{x(t)}$.

[Expression 1]

$$y(t) = \frac{\sum_{i=0}^{t} \alpha_{x(i)} x(i)}{\sum_{i=0}^{t} \alpha_{x(i)}} \quad (1)$$

Here, the greater the input reliability $\alpha_{x(t)}$ is, the greater the weighting provided is.

From Expression (1), the output signal $y(t-1)$ from one sample back from the current time t can be obtained from the following Expression.

[Expression 2]

$$y(t-1) = \frac{\sum_{i=0}^{t-1} \alpha_{x(i)} x(i)}{\sum_{i=0}^{t-1} \alpha_{x(i)}} \quad (2)$$

Also, with regard to the output signals $y(t)$ as well, output reliability $\alpha_{y(t)}$ which represents the closeness to the true value, i.e., the reliability that the output signals $y(t)$ are the true value, is introduced as the evaluation value of the output signals $y(t)$, and the output reliability $\alpha_{y(t-1)}$ for the output signal $y(t-1)$ from one sample back from the current time t is defined by the following Expression.

[Expression 3]

$$\alpha_{y(t-1)} = \sum_{i=0}^{t-1} \alpha_{x(i)} \quad (3)$$

In this case, from the Expressions (1) through (3), the output signals $y(t)$ and the output reliability $\alpha_{y(t)}$ thereof can be expressed as follows.

[Expression 4]

$$y(t) = \frac{\sum_{i=0}^{t-1} \alpha_{x(i)} x(i) + \alpha_{x(t)} x(t)}{\sum_{i=0}^{t-1} \alpha_{x(i)} + \alpha_{x(t)}}$$

$$= \frac{\alpha_{y(t-1)} y(t-1) + \alpha_{x(t)} x(t)}{\alpha_{y(t-1)} + \alpha_{x(t)}} \quad (4)$$

[Expression 5]

$$\alpha_{y(t)} = \alpha_{y(t-1)} + \alpha_{x(t)} \quad (5)$$

Also, the weight used for obtaining the output signal $y(t)$ at the time t is represented by $w(t)$, and is defined by the following Expression.

[Expression 6]

$$w(t) = \frac{\alpha_{y(t-1)}}{\alpha_{y(t-1)} + \alpha_{x(t)}} \quad (6)$$

From Expression (6), the following Expression holds.

[Expression 7]

$$1 - w(t) = \frac{\alpha_{x(t)}}{\alpha_{y(t-1)} + \alpha_{x(t)}} \quad (7)$$

Using Expressions (6) and (7), the output signals $y(t)$ in Expression (4) can be represented by a weighted average from the following multiplication and addition.

[Expression 8]

$$y(t) = w(t) y(t-1) + 1(1 - w(t)) \times (t) \quad (8)$$

Note that the weight $w(t)$ (and $1-w(t)$) used in Expression (8) can be obtained from Expression (6), from the output reliability $\alpha_{y(t-1)}$ for the output signal $y(t-1)$ from one sample back, and the input reliability $\alpha_{x(t)}$ for the current input signal $x(t)$. Also, the output reliability $\alpha_{y(t)}$ for the current output signal $y(t)$ can also be obtained from the output reliability $\alpha_{y(t-1)}$ for the output signal $y(t-1)$ from one sample back, and the input reliability $\alpha_{x(t)}$ for the current input signal $x(t)$.

Now, using the inverse numbers of the respective variances $\sigma_{x(t)}^2$ or $\sigma_{y(t)}^2$ as the input reliability $\alpha_{x(t)}$ for the input signals $x(t)$ or the output reliability $\alpha_{y(t)}$ for the output signals $y(t)$, i.e., defining the input reliability $\alpha_{x(t)}$ and the output reliability $\alpha_{y(t)}$ as in the following Expression,

[Expression 9]

$$\alpha_{x(t)} = \frac{1}{\sigma_{x(t)}^2}$$

$$\alpha_{y(t)} = \frac{1}{\sigma_{y(t)}^2} \quad (9)$$

the weight $w(t)$ in Expression (6) and the weight $1-w(t)$ in Expression (7) can be obtained from the following Expressions.

[Expression 10]

$$w(t) = \frac{\sigma_{x(t)}^2}{\sigma_{y(t-1)}^2 + \sigma_{x(t)}^2} \quad (10)$$

[Expression 11]

$$1 - w(t) = \frac{\sigma_{y(t-1)}^2}{\sigma_{y(t-1)}^2 + \sigma_{x(t)}^2} \quad (11)$$

Further, $\sigma_{y(t)}^2$ can be obtained by the following Expression.

[Expression 12]

$$\sigma_{y(t)}^2 = w(t)^2 \sigma_{y(t-1)}^2 + (1-w(t))^2 \sigma_{x(t)}^2 \quad (12)$$

The NR circuit shown in FIG. 3 basically follows Expression (6) to perform correction parameter computation processing for computing correction parameters serving as the weight w(t), and uses the weight w(t) to calculate the weighting average between the output signal y(t−1) from one sample back and the current input signal x(t) following Expression (8), thereby performing correcting processing for effectively removing noise contained in the input signals x(t).

Now, the user will not necessarily feel that the output signals obtained as the result of correction processing of the input signals by the weight w(t) obtained following Expression (6) are optimal. Accordingly, the NR circuit shown in FIG. 3 performs control data learning processing for obtaining parameter control data for controlling (correcting) the weight w(t) serving as the correction parameter, by learning the operations of operating unit 3 by the user, and performs correction processing of input signals using weighting corrected by the parameter control data.

The control data learning processing is performed as follows.

That is, a weight $W_i$ corresponding to learning operating signals provided at the i'th time by the user operating the operating unit 3 can be considered to be that which the user thinks to be optimal with regard to the input signals input at the time that the learning operating signals are provided, and accordingly, obtaining parameter control data which can correct the weight w(t) obtained following Expression (6) to a value near the weight $W_i$ corresponding to the learning operating signals (ideally, the same value) is sufficient for the control data learning processing.

To this end, let us now consider taking the weight w(t) obtained following Expression (6) as student data as a student for learning, and the weight $W_i$ corresponding to the learning operating signals as tutor data serving as a tutor for learning, and obtaining, from the weight w(t) serving as student data, a prediction value $W_i'$ for the weight $W_i$ serving as tutor data predicted by a linear expression defined by a parameter control data a and b such as shown in the following Expression.

[Expression 13]

$$W_i' = aw_i + b \quad (13)$$

Note that in Expression (13) (as with the later-described Expression (14) and Expressions (16) through (21)), $w_i$ represents the weight w(t) serving as student data obtained following Expression (6) as to input signals input at the time that the weight $W_i$ corresponding to the learning operating signals serving as tutor data is input.

From Expression (13), the error (prediction error) $e_i$ between $W_i$ serving as the tutor data and the prediction value $W_i'$ thereof is represented as shown in the following Expression.

[Expression 14]

$$\begin{aligned} e_i &= W_i - W_i' \\ &= W_i - (aw_i + b) \end{aligned} \quad (14)$$

Now, let us consider obtaining parameter control data a and b which minimizes the sum of the square error of the prediction error $e_i$ in Expression (14) as represented in the following Expression,

[Expression 15]

$$\sum_{i=1}^{N} e_i^2 \quad (15)$$

using least-square. Note that in Expression (15) (as with the later-described Expressions (16) through (21)), N represents the number of sets of tutor data and student data.

First, partial differentiation of the sum of the square error in Expression (15) with each of the parameter control data a and b yields the following expressions.

[Expression 16]

$$\frac{\partial \sum_{i=1}^{N} e_i^2}{\partial a} = -2 \sum_{i=1}^{N} w_i (W_i - (aw_i + b)) \quad (16)$$

[Expression 17]

$$\frac{\partial \sum_{i=1}^{N} e_i^2}{\partial b} = -2 \sum_{i=1}^{N} (W_i - (aw_i + b)) \quad (17)$$

Since the minimum value (minimal value) of the sum of the square error in Expression (15) can be obtained by a and b which make the right-hand side in Expressions (16) and (17) to be 0, setting the right-hand side in both Expressions (16) and (17) to 0 yields Expression (18) from Expression (16), and Expression (19) from Expression (17), respectively.

[Expression 18]

$$N \sum_{i=1}^{N} w_i W_i = Nb \sum_{i=1}^{N} w_i + Na \sum_{i=1}^{N} w_i^2 \quad (18)$$

[Expression 19]

$$Nb \sum_{i=1}^{N} W_i - a \sum_{i=1}^{N} w_i \quad (19)$$

Substituting Expression (19) into Expression (18) allows the parameter control data a to be obtained from the following Expression.

[Expression 20]

$$a = \frac{N\sum_{i=1}^{N} w_i W_i - \sum_{i=1}^{N} w_i \sum_{i=1}^{N} W_i}{N\sum_{i=1}^{N} w_i^2 - \left(\sum_{i=1}^{N} w_i\right)^2} \quad (20)$$

Also, from Expressions (19) and (20), the parameter control data b can be obtained from the following Expression.

[Expression 21]

$$b = \frac{\sum_{i=1}^{N} W_i - a\sum_{i=1}^{N} w_i}{N} \quad (21)$$

With the NR circuit shown in FIG. 3, control data learning processing is performed for obtaining parameter control data a and b, as described above.

Figure 5:
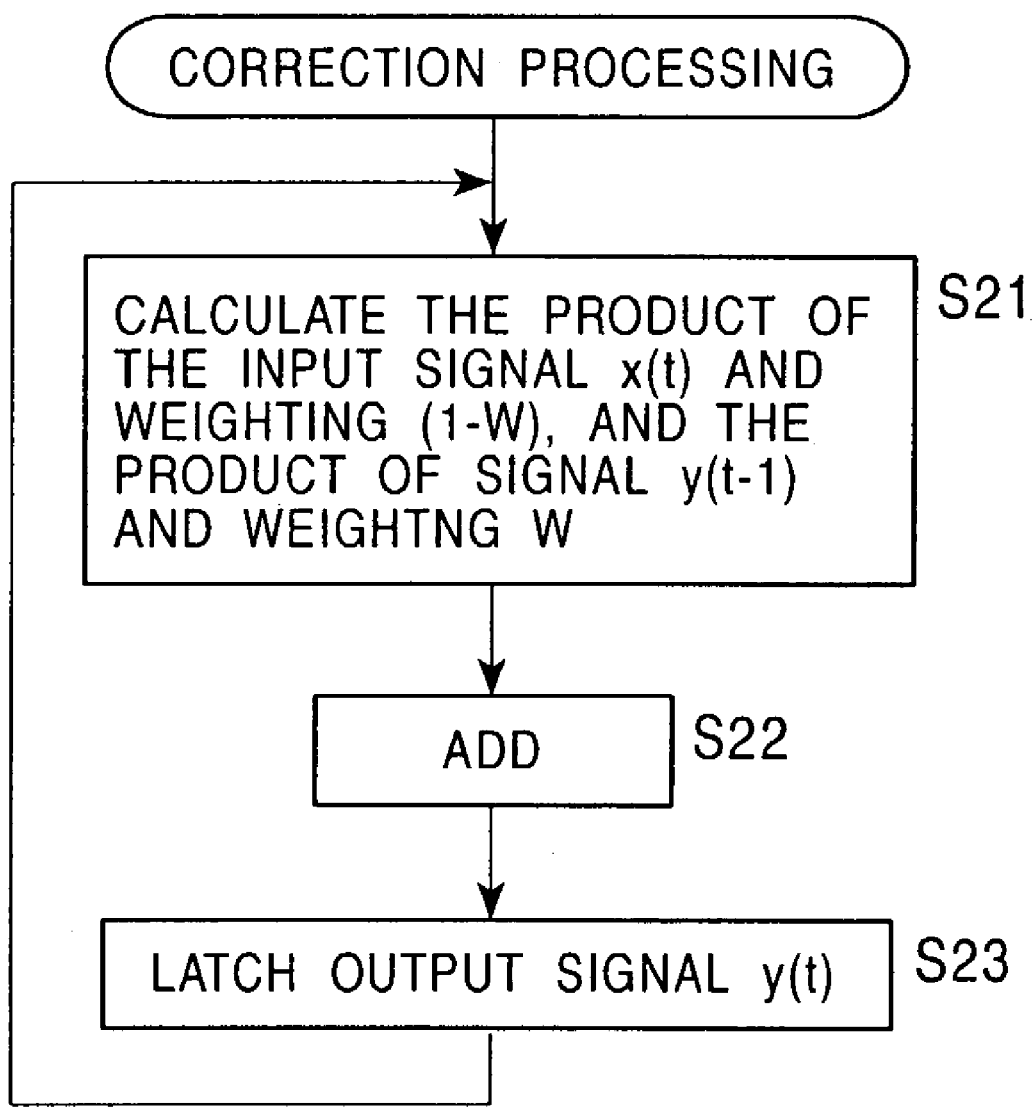
FIG. 5 is a flowchart describing correction processing with an NR circuit.

Next, the correction processing, correction parameter computation processing, and control data learning processing, which the NR circuit shown in FIG. 3 performs, will be described with reference to the flowcharts in FIG. 5 through FIG. 7.

First, correction processing will be described with reference to the flowchart in FIG. 5.

Upon weight w(t) serving as correction parameters being supplied from the selecting unit 21 of the learning unit 2 to the correcting unit 1, the weight memory 11 of the correcting unit 1 stores the weight w(t) in the form of overwriting. Further, the computing unit 13 of the correcting unit 1 subtracts the weight w(t) from 1.0, obtains the weight 1−w(t), supplies this to the weight memory 12, and stores this in the form of overwriting.

Then, upon input signals x(t) being supplied, in step S21 the computing unit 14 computes the product of the input signals x(t) and the weight 1−w(t) stored in the weight memory 12, and supplies this to the computing unit 16. Further, in step S21, the computing unit 15 computes the product of the weight w(t) stored in the weight memory 11 and output signal y(t−1) from one sample back latched by the latch circuit 17, and supplies this to the computing unit 16.

The flow then proceeds to step S22, where the computing unit 16 adds the product of the input signal x(t) and the weight 1−w(t), with the product of the weight w(t) and the output signal y(t−1), thereby obtaining the weighted addition value (1−w(t))x(t)+w(t)y(t−1) of the input signal x(t) and output signal y(t−1), which is output as the output signal y(t). This output signal y(t) is also supplied to the latch circuit 17, and the latch circuit 17 stores the output signal y(t) in the form of overwriting. Subsequently, the flow returns to step S21, waits for input signals of the next sample to be supplied, and subsequently, the same processing is repeated.

Next, correction parameter computing processing will be described with reference to the flowchart shown in FIG. 6.

With correction parameter computing processing, first, in step S31, the input reliability calculating unit 22 obtains input reliability $\alpha_{x(t)}$ based on dispersion of the input signals, for example.

That is, the input reliability calculating unit 22 has built-in unshown FIFO (first in first out) memory which is capable of latching, besides a sample x(t) of the current input signal, several past samples, with the dispersion thereof being calculated using the sample x(t) of the current input signal and several past samples, the inverse number thereof being obtained as the input reliability $\alpha_{x(t)}$, and supplied to the output reliability calculating unit 23 and weight calculating unit 25. Note that there are cases wherein there is not a sufficient number of input signal samples necessary for calculating dispersion immediately following starting input of the input signals, but in such cases, a default value, for example, is output as the input reliability $\alpha_{x(t)}$.

Subsequently, the flow proceeds to step S32, and the weight calculating unit 25 obtains the weight w(t) following Expression (6), using the input reliability $\alpha_{x(t)}$ from the input reliability calculating unit 22.

That is, at the timing that the input reliability $\alpha_{x(t)}$ is supplied from the input reliability calculating unit 22 to the weight calculating unit 25, the output reliability $\alpha_{y(t-1)}$ which the output reliability calculating unit 23 has output one sample back is latched at the latch circuit 24, and in step S32, the weight calculating unit 25 obtains the weight w(t) following Expression (6) using the input reliability $\alpha_{x(t)}$ from the input reliability calculating unit 12 and the output reliability $\alpha_{y(t-1)}$ latched by the latch circuit 14. This weight w(t) is supplied to the weight correcting unit 26.

Subsequently, the flow proceeds to step S33, and the weight correcting unit 26 reads the parameter control data out from the parameter control data memory 37, and proceeds to step S34. In step S34, the weight correcting unit 26 judges whether or not the parameter control data read out from the parameter control data memory 37 is data of a mode wherein the weight w(t) is not corrected, i.e., auto mode data representing a mode wherein the weight w(t) is obtained automatically, so to speak, from the input reliability and output reliability at the weight calculating unit 25 regardless of operations by the user at the operating unit 3 is used without change as weight W for correcting the input signals x(t) (hereafter may be referred to as auto mode).

In step S34, in the event that judgement is made that the parameter control data is not auto mode data, the flow proceeds to step S35, the weight correcting unit 26 corrects the weight w(t) supplied from the weight correcting unit 25 following the linear expression in Expression (13) defined by the parameter control data a and b supplied from the parameter control data memory 37, and proceeds to step S36. At step S36, the weight correcting unit 26 supplies the post-correction weight to the selecting unit 21, and proceeds to step S37. Here, in Expression (13), $w_i$ is equivalent to the weight w(t) supplied from the weight calculating unit 25, and $W_i'$ is equivalent to the post-correction weight W.

On the other hand, in step S34, in the event that judgement is made that the parameter control data is auto mode data, the flow skips step S35, proceeds to step S36, where the weight correcting unit 26 supplies the weight w(t) from the weight calculating unit 25 to the selecting unit 21 without change, and the flow proceeds to step S37.

In step S37, the output reliability calculating unit 23 updates the output reliability. That is, the output reliability calculating unit 23 adds, following Expression (5), the input reliability $\alpha_{x(t)}$ which the input reliability calculating unit 22 has calculated at the immediately previous step S31, and the output reliability $\alpha_{y(t-1)}$ from one sample back which the latch circuit 24 has latched, thereby obtaining the current output reliability $\alpha_{y(t)}$, which is stored in the latch circuit 24 in the form of overwriting.

Then, the flow proceeds to step S38, and the selecting unit 21 judges whether or not the operating unit 3 is being operated by the user, from the output of the operating signal processing unit 30. In the event that judgement is made that the operating unit 3 is not being operated in step S38, the flow proceeds to step S36, where the selecting unit 21 selects the weight supplied from the weight correcting unit 26 (hereafter may be referred to as correcting weight), which is output to the correcting unit 1, and the flow returns to step S31.

Also, in step S38, in the event that judgement is made that the operating unit 3 is being operated, the flow proceeds to step S40, where the selecting unit 21 selects the weight to be output by the operating signal processing unit 30 according to the operation, outputs this to the correcting unit 1, and the flow returns to step S31.

Figure 6:
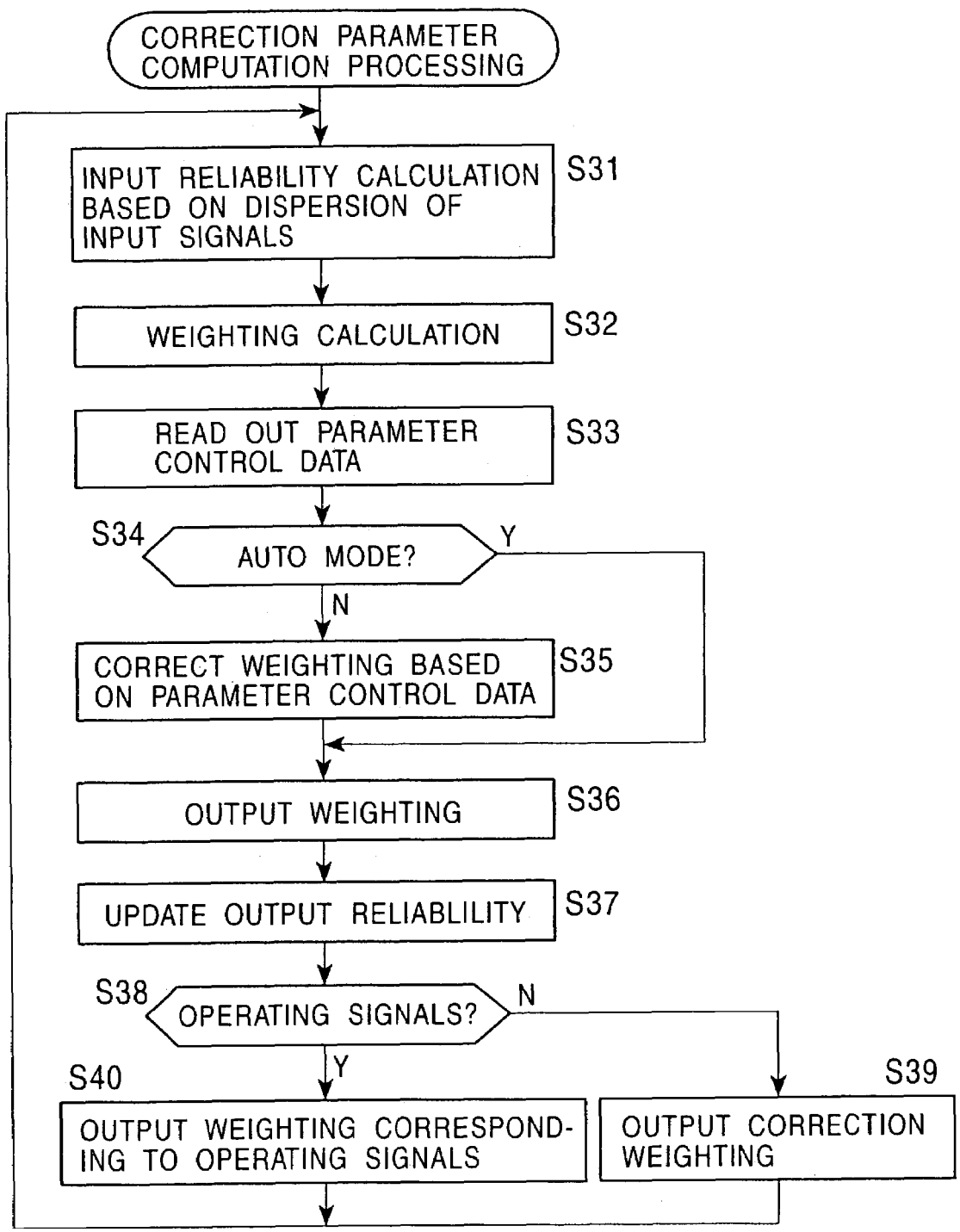
FIG. 6 is a flowchart describing correction parameter computation processing with an NR circuit.

Accordingly, in the correction parameter computing processing shown in FIG. 6, in the event that the operating unit 3 is not being operated, the correcting weight is supplied to the correcting unit 1, while in the event that the operating unit 3 is being operated, weighting corresponding to the operating signals is supplied to the correcting unit 1. As a result, at the correcting unit 1, in the event that the operating unit 3 is not being operated, the input signals are corrected by the correction weighting, and in the event that the operating unit 3 is being operated, the input signals are corrected by a weighting corresponding to the operating signals.

Figure 7:
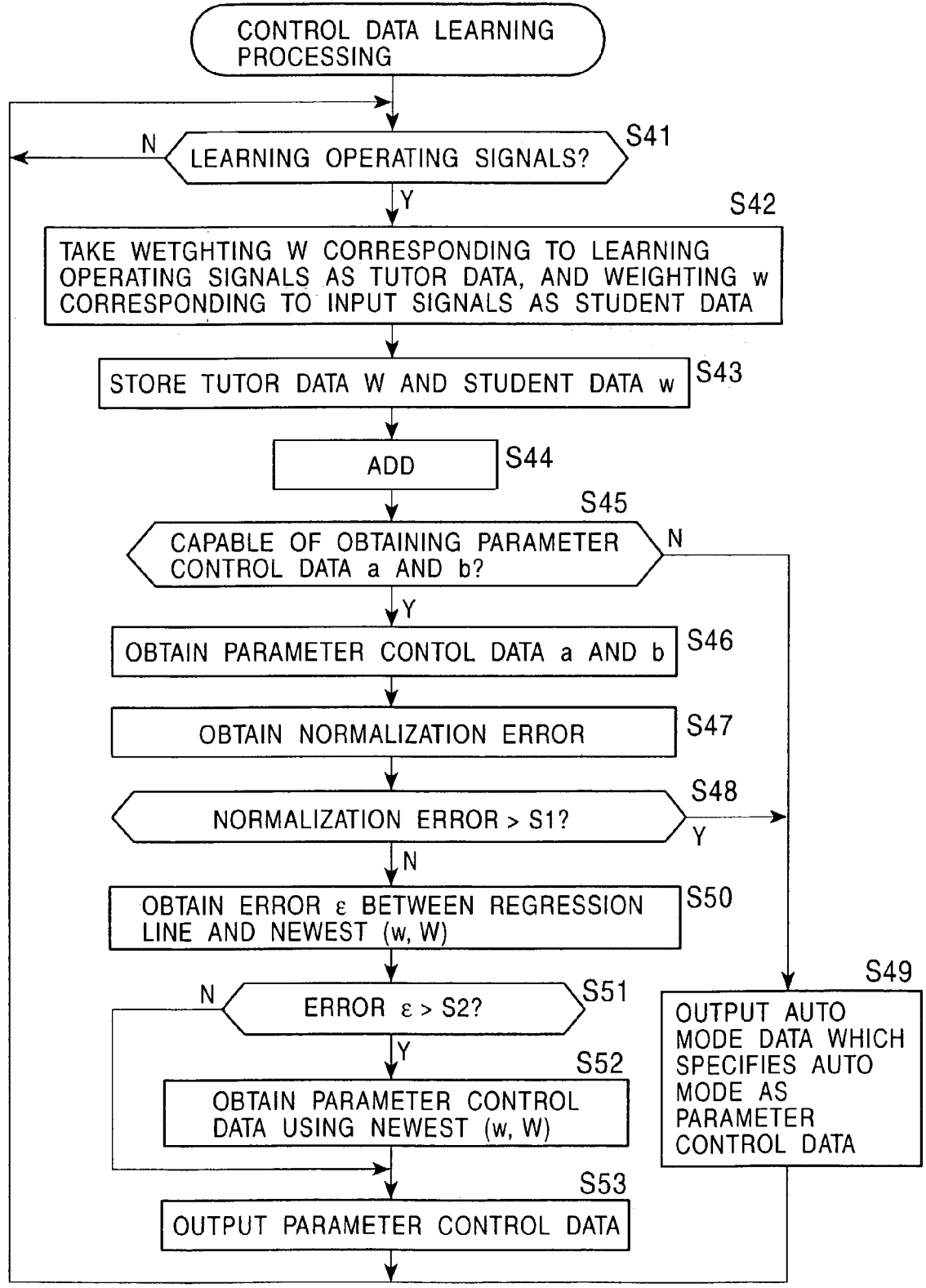
FIG. 7 is a flowchart describing control data learning processing with an NR circuit.

Further, in the correction parameter computing processing in FIG. 6, in the case of auto mode, weighting to be used for correction processing is obtained only from the input reliability and output reliability, regardless of the operations of operating unit 3, and if not in the auto mode, weighting to be used for correction processing is obtained using the parameter control data obtained by learning in the control data learning processing shown in FIG. 7, which will be described later, based on the operation of operating unit 3.

Next, the control data learning processing will be described with reference to the flowchart shown in FIG. 7.

In the control data learning processing, first, in step S41, the operating signal processing unit 30 judges whether or not learning operating signals have been received from the operating unit 3, and in the event that judgement is made that these have not been received, the flow returns to step S41.

Also, in the event that judgement is made in step S41 that learning operating signals have been received from the operating unit 3, that is to say, in the event that judgment can be made that the user has operated the operating unit 3 so as to obtain a desired output signal, such as in cases wherein, for example, the operating unit 3 starts to be operated, following which, without elapsing of a first time t1 or longer, operating is performed continuously for a second time t2 or longer, following which the operations thereof are stopped continuously for a third time t3 or longer, the flow proceeds to step S42, where the tutor data generating unit 31 generates tutor data, while the student data generating unit 32 generates student data.

That is, in the event of receiving learning operating signals, the operating signal processing unit 30 supplies weight W corresponding to the learning operating signals (for example, weight W corresponding to the amount of operating the operating unit 3 or the position of knobs or levers serving as operating unit 3) to the tutor data generating unit 31 and student data generating unit 32, along with a learning flag. Upon receiving a weight W with a learning flag, the tutor data generating unit 31 obtains the weight W as tutor data, and supplies this to the learning data memory 33. Also the student data generating unit 32, upon receiving the weight with a learning flag, obtains a weight w corresponding to the input signals at that time as student data, and supplies this to the learning data memory 33.

Here, the weight w corresponding to input signals means weight which is obtained automatically, so to speak, from the input reliability and output reliability, following Expression (6), and as described above, the student data generating unit 32 calculates this weight w corresponding to the input signals, from the input signals.

Upon receiving the tutor data W from the tutor data generating unit 31 and receiving the student data w from the student data generating unit 32, the learning data memory 33 stores the set of the newest tutor data W and student data w in step S43, and proceeds to step S44.

In step S44, the parameter control data calculating unit 34 performs adding in for the least-square, with regard to the tutor data and student data.

That is, the parameter control data calculating unit 34 performs computation equivalent to the multiplication $(w_i W_i)$ and summation $(\Sigma w_i W_i)$ of the student data $w_i$ and the tutor data $W_i$, computation equivalent to the summation $(\Sigma w_i)$ of the student data $w_i$, computation equivalent to the summation $(\Sigma W_i)$ of the tutor data $W_i$, and computation equivalent to the summation of the product of the student data $w_i$ with itself $(\Sigma w_i^2)$, in Expressions (20) and (21).

Now, saying that, for example, N−1 sets of tutor data and student data have already been obtained, and that the N'th set of tutor data and student data has been obtained as the newest tutor data and student data, at this point adding in with regard to the N−1'th set of tutor data and student data has already been performed at the parameter control data calculating unit 34. Accordingly, with regard to the N'th set of tutor data and student data, as long as the results of the adding in which has already been performed with regard to the N−1'th set of tutor data and student data has been saved, the results of adding in the N sets of tutor data and student data can be obtained including the newest tutor data and student data, by adding in the N'th set of tutor data and student data.

Accordingly, the parameter control data calculating unit 34 is arranged so as to store the previous adding in results in the learning information memory 35 as learning information, and so as to perform adding in with regard to the N'th set of tutor data and student data, using this learning information. Now, the number of sets N of the tutor data and student data used for the adding in so far is also necessary for the adding in, and the learning information memory 35 is arranged so as to also store the number of sets N as learning information.

Following performing the adding-in in step S44, the parameter control data calculating unit 34 stores the results of adding in, in the form of overwriting in the learning information memory 35 as learning information, and the flow proceeds to step S45.

In step S45, the parameter control data calculating unit 34 judges whether or not it is possible to obtain the parameter control data a and b with the Expressions (20) and (21), from the results of adding in serving as learning information stored in the learning information memory 35.

That is, with the set of tutor data and student data hereafter taken as a learning pair where appropriate, the parameter control data a and b cannot be obtained from the Expressions (20) and (21) unless learning information obtained by at least two learning pairs exists. Accordingly, in step S45, judgement is made regarding whether or not it is possible to obtain the parameter control data a and b from the learning information.

In the event that judgement is made in step S45 that obtaining the parameter control data a and b is not possible, the parameter control data calculating unit 34 supplies notification to that effect to the judgment control unit 36, and the flow proceeds to step S49. In step S49, the judgment control unit 36 supplies auto mode data indicating the auto mode to the parameter control data memory 37, where it is stored as parameter control data. The flow then returns to step S41, and subsequently, the same processing is repeated.

Accordingly, in the event that learning information sufficient for obtaining the parameter control data a and b does not exist, the weight w(t) automatically obtained from the input reliability and output reliability is used without change for correction of the input signals x(t), as described with reference to FIG. 6.

On the other hand, in the event that judgement is made in step S45 that the parameter control data a and b can be obtained, the flow proceeds to step S46, where the parameter control data calculating unit 34 obtains the parameter control data a and b by calculating the Expressions (20) and (21) using the learning information, which is supplied to the judgment control unit 36, and the flow proceeds to step S47.

In step S47, the judgment control unit 36 follows the linear expression in Expression (13) defined by the parameter control data a and b from the parameter control data calculating unit 34 to obtain, from each piece of student data stored in the learning data memory 33, prediction values of corresponding tutor data, and the sum of the square error indicated in Expression (15) for the prediction error of the prediction value thereof (the error as to the tutor data stored in the learning data memory 33), is obtained. Further, the judgment control unit 36 obtains a normalization error wherein the sum of the square error is divided by the number of learning pairs stored in the learning data memory 33, for example, and the flow proceeds to step S48.

In step S48, the judgment control unit 36 judges whether or not the normalization error is greater than (equal to or more than) a predetermined threshold value S1. In step S48, in the event that the normalization error is judged to be greater than the predetermined threshold value S1, i.e., in the event that the linear expression in Expression (13) defined by the parameter control data a and b does not approximate the relation between the student data and tutor data stored in the learning data memory 33 in a precise manner, the flow proceeds to step S49, where the judgment control unit 36 supplies auto mode data representing the auto mode to the parameter control data memory 37 as parameter control data, where it is stored, as described above. The flow then proceeds to step S41, and the same processing is repeated.

Accordingly, even if the parameter control data a and b can be obtained, in the event that the linear expression in Expression (13) defined by the parameter control data a and b does not approximate the relation between the student data and tutor data stored in the learning data memory 33 in a precise manner, the weight w(t) automatically obtained from the input reliability and output reliability is used without change for correction of the input signals x(t), in the same manner as with cases wherein learning information sufficient for obtaining the parameter control data a and b does not exist.

On the other hand, in step S48, in the event that judgement is made that the normalization error is not greater than the predetermined threshold value S1, i.e., in the event that the linear expression in Expression (13) defined by the parameter control data a and b approximates the relation between the student data and tutor data stored in the learning data memory 33 in a precise manner, the flow proceeds to step S50, where the judgment control unit 36, obtains the error (distance) $\epsilon$ between the regression line represented by the linear expression in Expression (13) defined by the parameter control data a and b from the parameter control data calculating unit 34, and the point stipulated by the newest tutor data and student data stored in the learning data memory 33.

The flow then proceeds to step S51, where the judgment control unit 36 judges whether or not the magnitude of the error $\epsilon$ is greater than (equal to or more than) the predetermined threshold value S2, and in the event that judgement is made that it is not greater, step S52 is skipped, the flow proceeds to step S53, and the judgment control unit 36 outputs the parameter control data a and b obtained in step S46 to the parameter control unit data memory 37. The parameter control data memory 37 stores the parameter control data a and b from the judgment control unit 36 in the form of overwriting, and the flow returns to step S41.

On the other hand, in the event that judgement is made in step S51 that the magnitude of the error $\epsilon$ is greater than the predetermined threshold value S2, the flow proceeds to step S52, where the judgment control unit 36 recalculates the parameter control data a and b using only a predetermined number of learning pairs back from the newest learning pair serving as the newest tutor data and student data stored in the learning data memory 33, by controlling the parameter control data calculating unit 34 (without using the learning information in the learning information memory 35). The flow then proceeds to step S53, where the judgment control unit 36 outputs the parameter control data a and b obtained in step S52 to the parameter control data memory 37, where it is stored in the form of overwriting, and the flow returns to step S41.

Accordingly, in the event that the parameter control data a and b can be obtained and also in the event that the linear expression in Expression (13) defined by the parameter-control data a and b approximates the relation between the student data and tutor data stored in the learning data memory 33 in a precise manner, the weight w(t) obtained from the input reliability and output reliability following Expression (13) defined by the parameter control data a and b obtained by learning being performed using the learning pairs obtained based on operation of operating unit 3 by the user is corrected, and corrected weight W obtained by the correction thereof is used for correction of the input signals x(t).

Figure 8A:
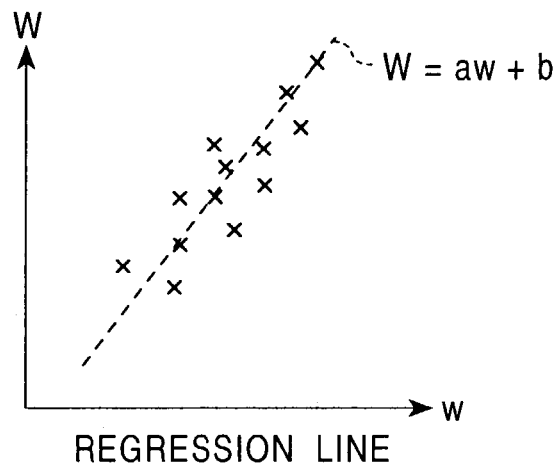
FIG. 8A through FIG. 8C are diagrams describing control data learning processing.

Now, the regression line represented by the linear expression in Expression (13) defined by the parameter control data a and b obtained in step S46 is a line which minimizes (the sum of) the square error with the N points stipulated by the N sets of tutor data and student data as shown in FIG. 8A, and in step S50, the error $\epsilon$ between this line and the point stipulated by the newest tutor data and student data, is obtained.

In the event that the magnitude of this error $\epsilon$ is not greater than the threshold value S2, the regression line represented by the linear expression in Expression (13) defined by the parameter control data a and b obtained in step S46 can be thought to be approximating each of the points stipulated by tutor data and student data provided so far, including the point stipulated with the newest tutor data and student data, in a relatively precise manner.

Figure 8B:
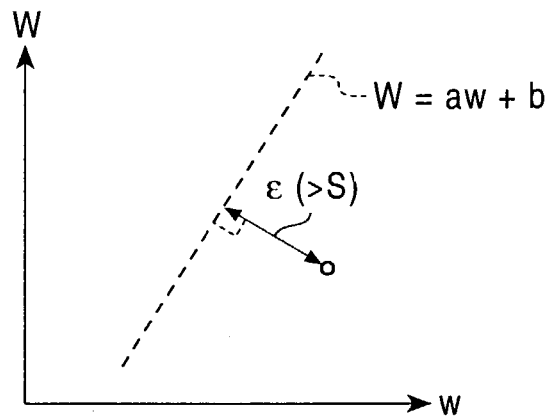

However, in the event that the magnitude of the error $\epsilon$ is greater than the threshold value S2, i.e., in the event that, as shown in FIG. 8B, the point stipulated by the newest tutor data and student data (indicated by a circle in FIG. 8B) greatly deviates from the regression line represented by the linear expression in Expression (13) defined by the parameter control data a and b obtained in step S46, it can be conceived that the user has performed operations of the operating unit 3 with a tendency that differs from those so far, for some reason.

Accordingly, in this case, the judging control unit 36 recalculates the parameter control data a and b in step S52 using only several of the newest learning pairs of the learning pairs that are stored in the learning data memory 33, by controlling the parameter control data calculating unit 34.

That is to say, in this case, the parameter control data calculating unit 34 recalculates the parameter control data a and b defining the line in Expression (13) which most closely approximates the group of points stipulated by a tutor data and student data, using only several recent tutor data and student data sets, without using (forgetting) the learning information serving as past results of adding in that are stored in the learning information memory 35.

Figure 8C:
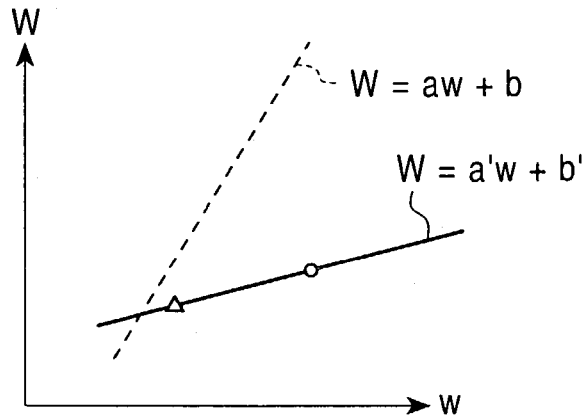

Specifically, as shown in FIG. 8C, for example, the parameter control data calculating unit 34 obtains parameter control data a' and b' defining a line which passes through a point stipulated by the newest tutor data and student data (indicated by a circle in FIG. 8C), and a point stipulated by the tutor data and student data provided one time back (indicated by triangle in FIG. 8C).

As described above, judgment is made regarding whether or not operating signals supplied according to user operations can be used for learning or not, and in the event that the signals are learning operating signals which can be used for learning, parameter control data a and b for correcting the weight for correcting input signals is learned based on the learning operating signals, so the operations of the user can be learned without the use and knowing, and as a result, processing which is suitable for the user gradually comes to be performed based on the learned results, ultimately performing processing of which is optimal for the user.

This means that, from the perspective of the user, after normally operating the operating unit 3 for a while, noise reduction results which are optimal for the user can be obtained with regard to various types of input signals even without making operations, and accordingly, the device becomes broken in, so to speak. At this stage of breaking in the device, the user operates the operating unit 3 so as to obtain desired output signals, so the relation between the operations of the operating unit 3 and the weight W used for correcting input signals gradually comes to be clearly recognized by the user, so ultimately, the operations of the operating unit 3 by the user and the weight W used for correcting input signals come to be qualitatively correlated. Also, at the NR circuit shown in FIG. 3, the weight W used for the correction processing (FIG. 5) performed at the correcting unit 1 following the operations of operating unit 3 by the user is changed so that the desired output signals by the user can be obtained. That is, upon the user operating the operating unit 3, the operating signal processing unit 30 outputs a weight representing the operating signals corresponding to the operations, the selecting unit 21 selects the weight, and supplies this to the correcting unit 1. In this case, at the correcting unit 1, correction processing indicated by Expression (8) is performed using the weight corresponding to the operations made by the user. In the event that the weight w(t) in Expression (8) is to be changed, due to operations made by the user, the contents of the processing (correction processing) represented by Expression (8) are also changed, as a matter of course, so it can be said that at the NR circuit shown in FIG. 3, the "contents of processing" are being changed following the operations of the user so that output signals desired by the user can be obtained.

Further, at the NR circuit shown in FIG. 3, in the event that the parameter control data a and b cannot be obtained, or in the event that this can be obtained but the linear expression in Expression (13) defined by the parameter control data a and b does not approximate the relation between the student data and tutor data stored in the learning data memory 33 in a precise manner, weighting automatically obtained from the input reliability and output reliability are used for correction processing at the correcting unit 1. On the other hand, in the event that the parameter control data a and b can be obtained, and also, the linear expression in Expression (13) defined by the parameter control data a and b approximates the relation between the student data and tutor data stored in the learning data memory 33 in a precise manner, the weighting obtained from the input reliability and output reliability is corrected following Expression (13) defined by the parameter control data a and b obtained by learning being performed using learning pairs obtained based on operations of operating unit 3 by the user, and corrected weighting obtained by this correcting is used for correction processing by the correcting unit 1.

That is to say, with the NR circuit shown in FIG. 3, in the event that sufficient learning pairs have not been input from the user, or in the event that learning pairs whereby highly precise approximation is possible have not been input, weight automatically obtained from the input reliability and output reliability is used for the correction processing at the correcting unit 1, and in the event that learning pairs whereby highly precise approximation is possible have been input, correction weighting obtained by the parameter control data a and b obtained by learning being performed using the learning pairs is used for correction processing at the correcting unit 1.

Accordingly, the weight w(t) in Expression (8) does, after all, change between cases wherein a sufficient number of learning pairs or learning pairs enabling highly precise approximation are not obtained, and cases wherein learning pairs enabling highly precise approximation are obtained, and consequently, the contents of correction processing represented by the Expression(8) also change, so from this perspective as well with the NR circuit shown in FIG. 3, it can be said that the "contents of processing" are changed so that output signals desired by the user are obtained.

Further, with the NR circuit in FIG. 3, the system for calculating weight used for the correction processing changes depending on the cases wherein a sufficient number of learning pairs or learning pairs enabling highly precise approximation are not obtained, and cases wherein learning pairs enabling highly precise approximation are obtained.

That is to say, in cases wherein a sufficient number of learning pairs or learning pairs enabling highly precise approximation are not obtained, the weight is obtained from the input reliability and output reliability, regardless of operations made by the user. On the other hand, in the event that learning pairs enabling highly precise approximation has been obtained, the weighting is obtained based on the parameter control data obtained by learning using the learning pairs obtained based on the operations of the user.

Accordingly, in this case, it can be said that the processing system for calculating weighting, i.e., the algorithm for how to obtain weighting, is changed such that output signals desired by the user can be obtained, following operations of the user.

Now, representing the processing for obtaining weight with a function F the above-described change of "contents of processing" is equivalent to the function F being changed. Here, cases of the function F being changed are generally divided into cases wherein the form of the function F itself changes (e.g., cases wherein F=x changes to $F=x^2$, etc.), and cases wherein the form of the function F itself does not change but the coefficients defining the function F change (e.g., F=2x changes to F=3x, etc.).

Now, of the changes in "contents of processing", if we say that cases wherein the form of the function F representing the processing of itself changes are changes of the "structure of processing", changing the processing system for calculating wait (the algorithm for how to obtain weight) as described above can be said to be changing the "structure of processing".

Accordingly, with the NR circuit shown in FIG. 3, the "contents of processing", and further, the "structure of processing" is also changed following operations made by the user, whereby output signals desired by the user can be obtained.

Also, as for input signals, image signals and audio signals may be used, of course, and other signals as well. However, in the case that the input signals are image signals, the input reliability is calculated based on dispersion obtained from multiple pixels near a pixel to be processed, either space-wise or time-wise.

Also, with the above-described case, the weight w obtained from input reliability and the like is corrected to the correcting weight W by the linear expression in Expression (13) defined by the parameter control data a and b in the learning unit 2, in order to facilitate description, but actually, correction of the weight w is preferably performed by a higher expression. Also, the degree in the higher expression is preferably set to a suitable value based on applications and the like to which the optimizing device is applied, for example.

Further, an arrangement may be made for the expression for obtaining the correction weight W from the weight w (hereafter may be referred to as correction weight calculating expression) wherein multiple expressions are prepared besides the linear expression W=aw+b in Expression (13), such as, for example, the quadratic expression W=aw$^2$+bw+c, the cubic expression W=aw$^3$+bw$^2$+cw+d, and so forth (wherein a, b, c, and d, are predetermined coefficients), and wherein that of the multiple correction weight calculating expressions which shields the smallest normalization error is employed. Note that in this case, the correction weight calculating expression wherein the normalization error obtained from the learning pair obtained by operations of the user is smallest, is selected, and the correction weighting is to be obtained using the selected correcting weight calculating expression. That is to say., the algorithm for how to obtain the correction weight is changed following the operations of the user. Accordingly, in this case as well, it can be said that the "structure of processing" is being changed following operations of the user.

Figure 9:
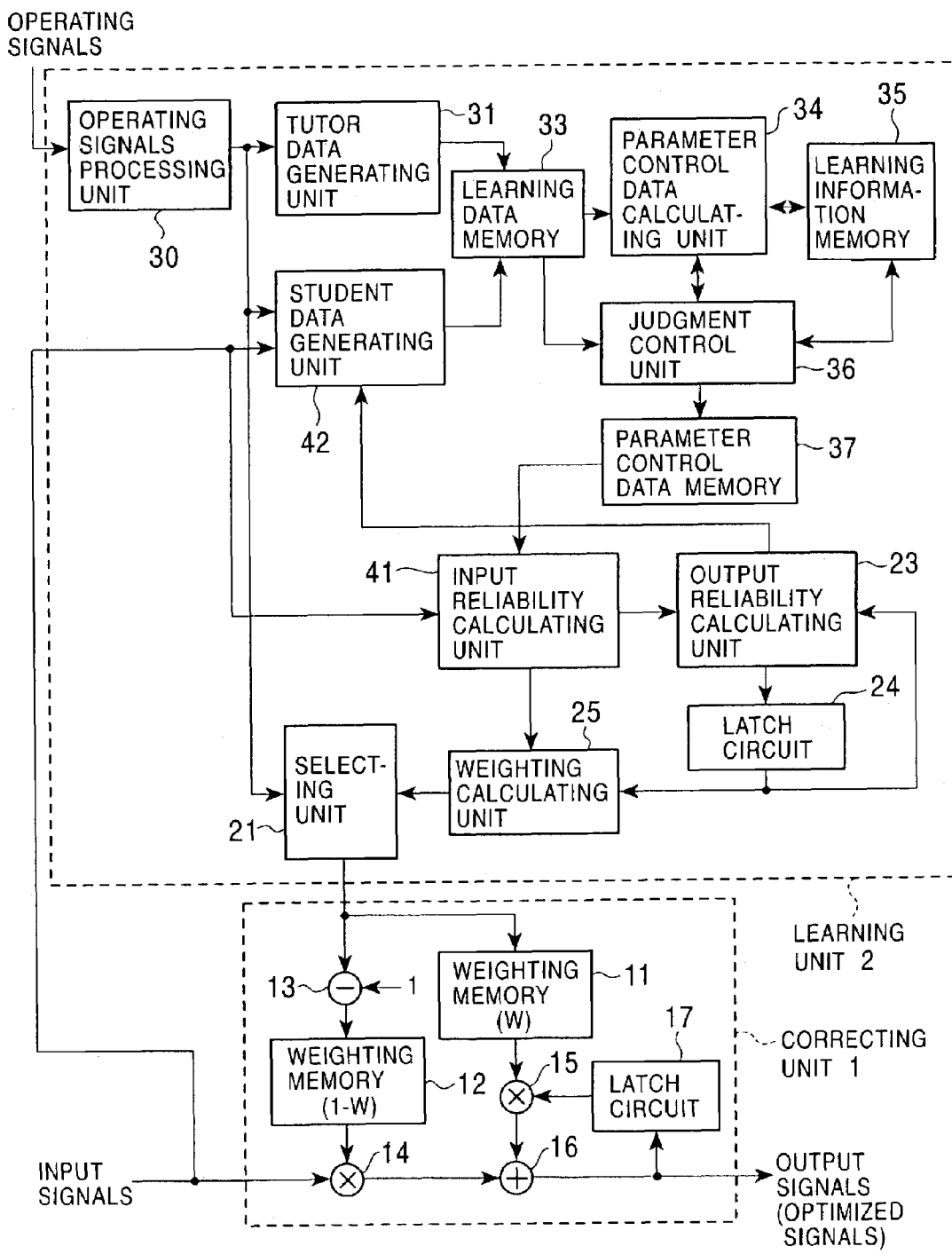
FIG. 9 is a block diagram illustrating a configuration example of another embodiment of an NR circuit using an optimizing device.

Next, FIG. 9 illustrates another detailed configuration example of a case wherein the optimizing device shown in FIG. 1 is applied to an NR circuit. In the figure, the parts corresponding to the case in FIG. 3 are denoted with the same reference numerals, and further description thereof will be omitted as suitable. That is to say, the NR circuit shown in FIG. 9 is basically the same configuration as that shown in FIG. 3, other than not being provided with the weight correcting unit 26, and an input reliability calculating unit 41 and student data generating unit 42 being provided instead of the input reliability calculating unit 22 and student data generating unit 32, respectively.

The input reliability calculating unit 41 calculates the input reliability of the input signals from multiple samples of input signals and parameter control data stored in the parameter control data memory 37, and supplies this to the output reliability calculating unit 23 and weight calculating unit 25.

The student data generating unit 42 obtains the input signals, and the output reliability output from the output reliability calculating unit 23, as student data, and supplies this to the learning data memory 33.

Note that with the embodiment shown in FIG. 9, there is no weight correcting unit 26 provided, so the weight obtained in the weight calculating unit 25 is applied to the selecting unit 21 with no change, and this selecting unit 21 is arranged so as to select and output one or the other of the weight output by this weight calculating unit 25 and the weight output by the operating signal processing unit 30, in the same way as with that shown in FIG. 3.

Also, with the embodiment shown in FIG. 9, the parameter control data functions as data to control input reliability.

As with the NR circuit shown in FIG. 3, the NR circuit in FIG. 9 also performs correction processing, correction parameter computation processing, and control data learning processing. The correction processing is performed in the same way as the processing described with reference to FIG. 5, so description of the correction processing will be omitted for the NR circuit shown in FIG. 9, and description will be made regarding the correction parameter computation processing and control data learning processing.

That is to say, with the NR circuit in FIG. 9, correction parameter computation processing and control data learning processing is performed with the input reliability $\alpha_{x(t)}$ stipulating the weight shown in Expression (6) which is used in correction processing as being defined by the following expression, for example.

[Expression 22]

$$\alpha_{x(t)} = a_1 x_1 + a_2 x_2 + \ldots + a_N x_N \quad (22)$$

Figure 10:
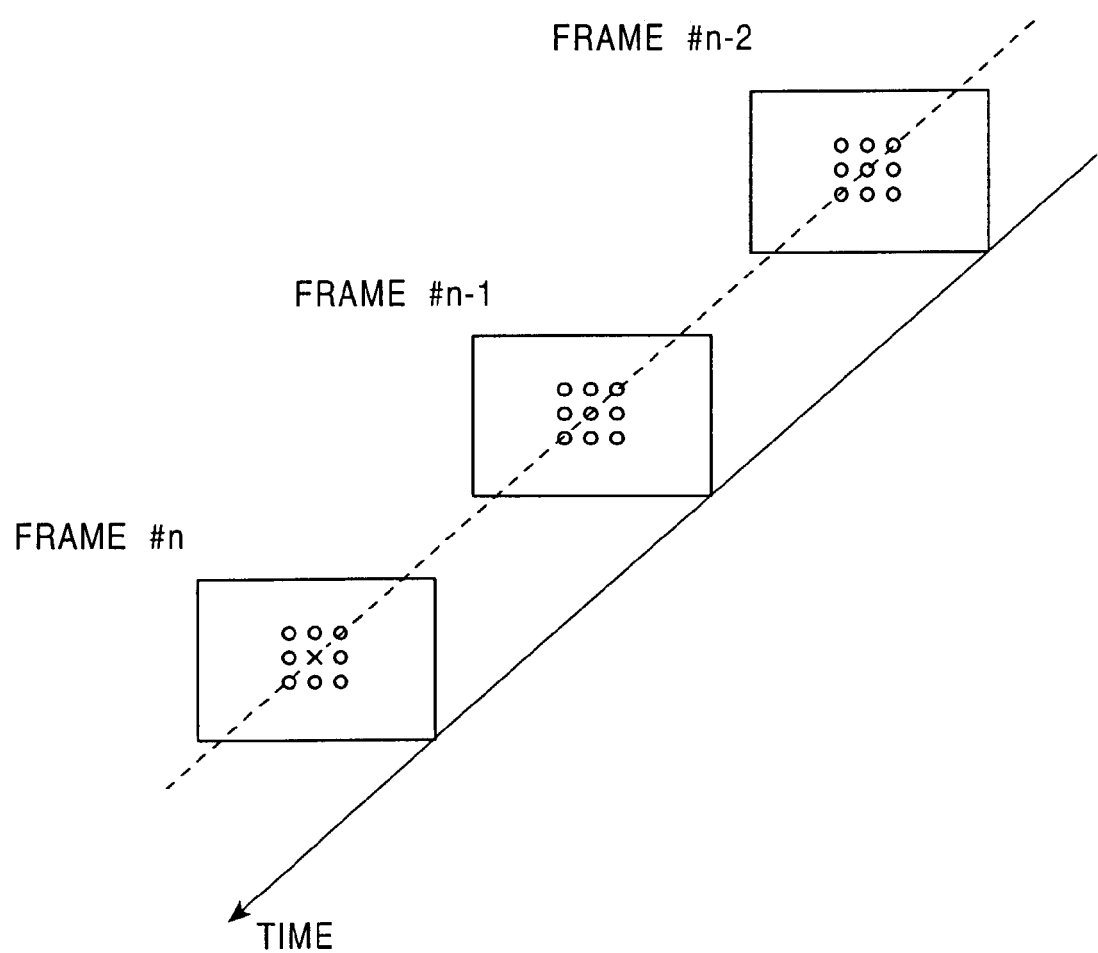
FIG. 10 is a diagram illustrating pixels multiplied with parameter control data.

Note that, however, in Expression (22), $a_1, a_2, \ldots, a_N$ represent parameter control data, and $x_1, x_2, \ldots, x_N$ represent samples of input signals in a predetermined relation with samples of input signals which are to be subjected to processing (samples of interest). Now, in the event that the input signals are image signals for example, a pixel serving as a pixel of interest (indicated by an X in FIG. 10) and a pixel at a position near that pixel space-wise or time-wise (indicated by a circle in FIG. 10), can be used for $x_1, x_2, \ldots, x_N$, for example.

From Expression (22), the weight w(t) provided in Expression (6) can be represented as in Expression (23).

[Expression 23]

$$w(t) = \frac{\alpha_{y(t-1)}}{\alpha_{y(t-1)} + \alpha_{x(t)}} \quad (23)$$

$$= \frac{\alpha_{y(t-1)}}{\alpha_{y(t-1)} + (a_1 x_1 + a_2 x_2 + \ldots + a_N x_N)}$$

Accordingly, in the event that the input signals $x_1, x_2, \ldots, x_N$, are input, parameter control data $a_1, a_2, \ldots, a_N$ which satisfies the following Expression should be obtained from Expression (23) in order to obtain the weight W provided from the user.

[Expression 24]

$$W = \frac{\alpha_{y(t-1)}}{\alpha_{y(t-1)} + (a_1 x_1 + a_2 x_2 + \ldots + a_N x_N)} \quad (24)$$

As a variant of the Expression (24), Expression (25) can be obtained.

[Expression 25]

$$(a_{x1} x_1 + a_2 x_2 + \ldots + a_N x_N) W + (W-1) \alpha_{y(t-1)} = 0 \quad (25)$$

Obtaining the parameter control data $a_1, a_2, \ldots, a_N$ which satisfies Expression (25) at all times is generally difficult, so here, we will consider obtaining parameter control data $a_1$, $a_2, \ldots, a_N$ wherein, for example, the sum of the square error of the left-hand side and right-hand side of the Expression (25) is smallest, by the least-square method.

Here, making the sum of the square error of the left-hand side and right-hand side of the Expression (25) to be smallest means making the square error of the weight, w(t) provided by the Expression (23) and the weight W provided by the user to be smallest, i.e., with the weight W provided by the user as tutor data, and the input signals $x_1, x_2, \ldots, x_N$, and output reliability $\alpha_{y(t-1)}$ defining the weight w(t) in Expression (23) as student data, equivalent to making the square error of the weight w(t) calculated from the student data by Expression (23) and the weight W serving as tutor data provided by the user to be smallest, and the weight w(t) calculated from such parameter control data $a_1, a_2, \ldots, a_N$ and the student data has a small error with the tutor data W.

The square-error $e^2$ of the left-hand side and right-hand side of Expression (25) is provided by Expression (26).

[Expression 26]

$$e^2 = \{(a_1 x_1 + a_2 x_2 + \ldots + a_N x_N)W + (W-1)\alpha_{y(t-1)}\}^2 \quad (26)$$

The parameter control data $a_1, a_2, \ldots, a_N$ which makes the square-error $e^2$ smallest is provided by the conditions that partial differentiation of the square-error $e^2$ in Expression (26) by each of the parameter control data $a_1, a_2, \ldots, a_N$ yields 0, i.e., by the following Expression.

[Expression 27]

$$\frac{\partial e^2}{\partial a_1} = 0, \frac{\partial e^2}{\partial a_2} = 0, \ldots, \frac{\partial e^2}{a_N} = 0 \quad (27)$$

Substituting Expression (26) into Expression (27) yields Expression (28).

[Expression 28]

$$(a_1 x_1 W + a_2 x_2 W + \ldots + a_N x_N W + (W-1)\alpha_{y(t-1)})W x_1 = 0 \quad (28)$$
$$(a_1 x_1 W + a_2 x_2 W + \ldots + a_N x_N W + (W-1)\alpha_{y(t-1)})W x_2 = 0$$
$$\vdots$$
$$(a_1 x_1 W + a_2 x_2 W + \ldots + a_N x_N W + (W-1)\alpha_{y(t-1)})W x_N = 0$$

Accordingly, defining the matrixes X, A, and Y each as shown in Expression (29), the relation shown in Expression (30) holds for the matrixes X, A, and Y, from the Expression (28).

[Expression 29]

$$X = \begin{bmatrix} \sum W^2 x_1^2 & \sum W^2 x_2 x_1 & \ldots & \sum W^2 x_N x_1 \\ \sum W^2 x_1 x_2 & \sum W^2 x_2^2 & \ldots & \sum W^2 x_N x_2 \\ \vdots & \vdots & \ddots & \vdots \\ \sum W^2 x_1 x_N & \sum W^2 x_2 x_N & & \sum W^2 x_N^2 \end{bmatrix}, \quad (29)$$

$$A = \begin{bmatrix} a_1 \\ a_2 \\ \vdots \\ a_N \end{bmatrix}, Y = \begin{bmatrix} \sum W(1-W)\alpha_{y(t-1)} x_1 \\ \sum W(1-W)\alpha_{y(t-1)} x_2 \\ \vdots \\ \sum W(1-W)\alpha_{y(t-1)} x_N \end{bmatrix}$$

[Expression 30]

$$XA = Y \quad (30)$$

Note that the summation ($\Sigma$) in Expression (29) means the summation with regard to the number of sets of input signals $x_1$ through $x_N$ and the weight W provided from the user upon the input signals $x_1$ through $x_N$ being input from the user.

Expression (30) can be solved with regard to the matrix (vector) A, i.e., the parameter control data $a_1, a_2, \ldots, a_N$, by the Cholesky method or the like, for example.

The NR circuit in FIG. 9 performs control data learning processing as described above, wherein, with the weight W provided by the user as tutor data, and with the parameter control data $a_1, a_2, \ldots, a_N$, and output reliability $\alpha_{y(t-1)}$ defining the weight w(t) in Expression (23) as student data, input signals $x_1, x_2, \ldots, x_N$, minimizing the square error of the weight w(t) calculated from the student data by Expression (23) and the weight W serving as tutor data provided by the user is learned by the least-square. Further, the NR circuit in FIG. 9 obtains the input reliability $\alpha_{x(t)}$ from the Expression (22) defined by the parameter control data $a_1$ through $a_N$, and further performs correction parameter computing processing for obtaining the weight serving as correction parameters, following Expression (23), from the input reliability $\alpha_{x(t)}$ and output reliability $\alpha_{y(t-1)}$.

Now, the correction parameter computing processing with the NR circuit shown in FIG. 9 will be described with reference to the flowchart in FIG. 11.

In the correction parameter computing processing, first, in step S61, the input reliability calculating unit 41 reads out the parameter control data from the parameter control data memory 37, and the flow proceeds to step S62. In step S62, the input reliability calculating unit 41 judges whether or not the parameter control data read out from the parameter control data memory 37 is auto mode data which represents a mode wherein input reliability is obtained without using parameter control data, i.e., a mode wherein input reliability is obtained automatically, so to speak, from input signals alone (this mode also may hereafter be referred to as auto mode), regardless of operations of operating unit 3 by the user.

In step S62, in the event that judgment is made that the parameter control data is not auto mode data, the flow proceeds to step S63, the input reliability calculating unit 41 obtains using the newest N pieces of input signal samples $x_1$ through $x_N$ supplied thereto, following the linear expression in the Expression (22) defined by the parameter control data $a_1$ through $a_N$ read out from the parameter control data memory 37, supplies this to the output reliability calculating unit 23 and weight calculating unit 25, and proceeds to step S65.

Also, in the event that the parameter control data is judged to be auto mode data in step S62, the flow proceeds to step S64, and the input reliability calculating unit 41 obtains the input reliability $\alpha_{x(t)}$ using the input signals alone, based on dispersion thereof, in the same manner as with step S31 in FIG. 6, for example, and supplies this to the output reliability calculating unit 23 and weight calculating unit 25.

In step S65, the weight calculating unit 25 obtains the weight w(t) following Expression (23), using the input reliability $\alpha_{x(t)}$ from the input reliability calculating unit 41, and the output reliability $\alpha_{y(t-1)}$ output one sample back by the output reliability calculating unit 23, which is latched at the latch circuit 24. This weight w(t) is supplied from the weight calculating unit 25 to the selecting unit 21.

Subsequently, the flow proceeds to step S66, and in the same manner as with step S37 in FIG. 6, the output reliability calculating unit 23 adds the input reliability $\alpha_{x(t)}$ supplied from the input reliability calculating unit 41 and the output reliability $\alpha_{y(t-1)}$ output one sample back, which is latched at the latch circuit 24 according to Expression (5), thereby updating the output reliability $\alpha_{y(t)}$, and storing in the form of overwriting the latch circuit 24.

The flow then proceeds to step S67, where the selecting unit 21 judges whether or not the operating unit 3 is being operated by the user, from the output of operating signal processing unit 30. In the event that judgment is made in step S67 that operating unit 3 is not being operated, the flow proceeds to step S68, the selecting unit 21 selects the weight supplied from the weight calculating unit 25, outputs this to the correcting unit 1, and the flow returns to step S61.

Also, in the event that judgment is made in step S67 that the operating unit 3 is being operated, the flow proceeds to step S69, where the selecting unit 21 selects the weight output by the output signal processing unit 30 according to operations thereof, outputs this to the correcting unit 1, and the flow returns to step S61.

Figure 11:
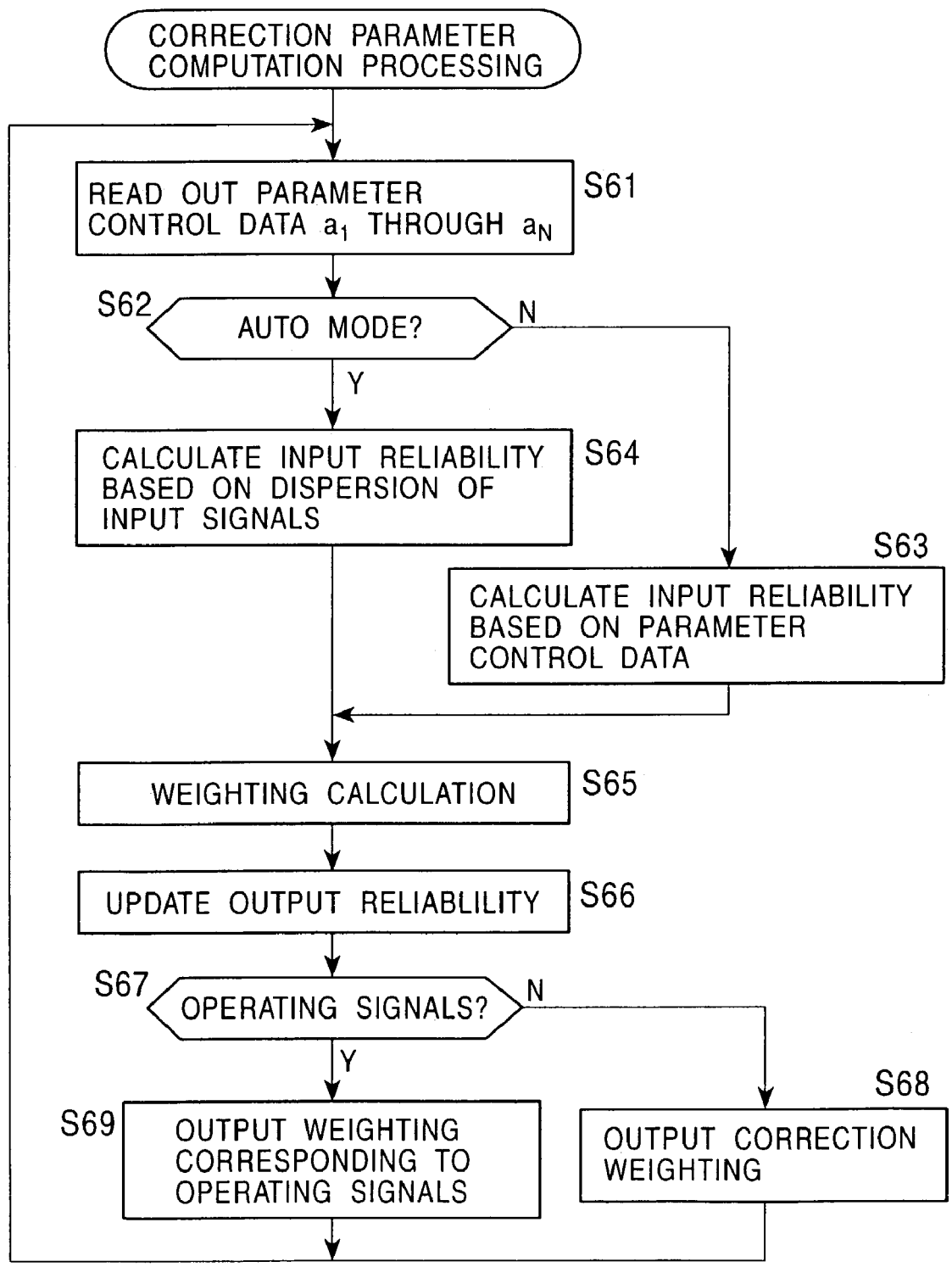
FIG. 11 is a flowchart describing correction parameter computation processing with an NR circuit.

Accordingly, in the correction parameter computing processing in FIG. 11, in the event that the operating unit 3 is not being operated, weight calculated based on input reliability is supplied to the correcting unit 1, and in the event of operating unit 3 is being operated, weight corresponding to the operating signals thereof are supplied to the correcting unit 1. Consequently, at the correcting unit 1, in the event that the correcting unit 3 is not being operated, input signals are corrected by weighting based on input reliability, and in the event that operating unit 3 is being operated, input signals are corrected by weighting corresponding to the operating signals thereof.

Figure 12:
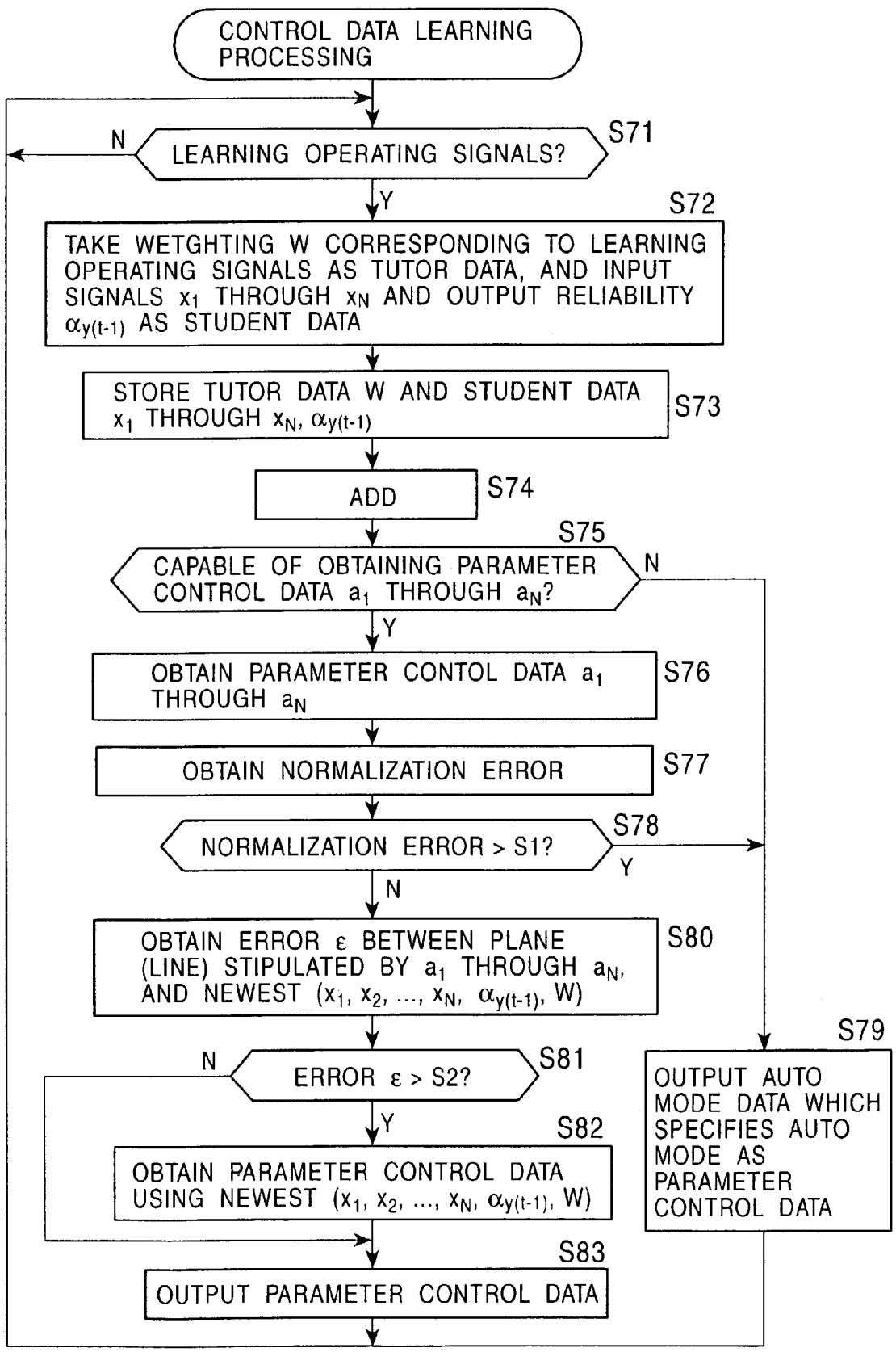
FIG. 12 is a flowchart describing control data learning processing with an NR circuit.

Further, with the correction parameter computing processing in FIG. 11, in the case of the auto mode, the weight to be used for correction processing is obtained from the input reliability based on dispersion of input signals regardless of operations of the operating unit 3, and in the event of not being in the auto mode, the weight used for correction processing is obtained from input reliability obtained using the parameter control data obtained by learning with the control data learning processing shown in FIG. 12 which shall be described later, based on the operations of operating unit 3.

Next, the control data learning processing which the NR circuit shown in FIG. 9 performs will be described with reference to the flowchart in FIG. 12.

With the control data learning processing, first, in step S71, in the same manner as with step S41 in FIG. 7, the operating signal processing unit 30 judges whether or not learning operating signals have been received from the operating unit 3, and in the event that judgment is made that these have not been received, the flow returns to step S71.

Also, in the event that judgment is made in step S71 that learning operating signals have been received from the operating unit 3, i.e., in the event that judgment can be made that the user has operated the operating unit 3 so as to obtain a desired output signal, such as in cases wherein, for example, the operating unit 3 starts to be operated, following which, without elapsing of a first time t1 or longer, operating is performed continuously for a second time t2 or longer, following which the operations thereof are stopped continuously for a third time t3 or longer, or cases wherein following starting the operations of the operating unit 3, operations thereof are stopped continuously for a third time t3 or longer, the flow proceeds to step S72, where the tutor data generating unit 31 generates tutor data, while the student data generating unit 42 generates student data.

That is, in the event of receiving learning operating signals, the operating signal processing unit 30 supplies weight W corresponding to the learning operating signals to the tutor data generating unit 31 and student data generating unit 42, along with a learning flag. Upon receiving a weight W with a learning flag, the data generating unit 31 obtains the weight W as tutor data, and supplies this to the learning data memory 33.

On the other hand, the student data generating unit 42 has a built-in buffer (not shown) for buffering input signals, and constantly stores input signals in the buffer to the storage capacity thereof, and in the event of receiving a weight with the learning flag, samples $x_1$ through $x_N$ of input signals in a predetermined positional relation with samples of the input signals input at that time are read out from the built-in buffer. Further, the student data generating unit 42 reads out the output reliability $\alpha_{y(t-1)}$ from the output reliability calculating unit 23. The student data generating unit 42 then supplies the samples $x_1$ through $x_N$ of input signals and output reliability $\alpha_{y(t-1)}$ to the learning data memory 33 as student data.

Upon receiving the tutor data W from the tutor data generating unit 31 and the student data $x_1$ through $x_N$ and output reliability $\alpha_{y(t-1)}$ from the student data generating unit 42, in step S73 the learning data memory 33 stores the set of the newest tutor data W, and student data $x_1$ through $x_N$ and $\alpha_{y(t-1)}$ and the flow proceeds to step S74.

At step S74, the parameter control data calculating unit 34 performs adding-in for least-square, for the tutor data and student data.

That is, the parameter control data calculating unit 34 performs computation of the product between one student data with another which are components of the matrix X and Y in Expression (29), the product of the student data and tutor data, and the summation thereof.

Now, the adding in step S74 is performed in the same manner as that in step S44 in FIG. 7. That is to say, the results of the previous adding-in are stored in the learning information memory 35 as learning information, and the parameter control data calculating unit 34 uses this learning information to perform adding in with regard to the newest tutor data and student data.

Following the adding in step S74, the parameter control data calculating unit 34 stores the results of the adding-in within the learning information memory 35, as learning information, in the form of overwriting, the flow proceeds to step S75, and the parameter control data computing unit 34 judges whether or not Expression (30) can be solved with regard to matrix A from the adding results as learning information stored in the learning information memory 35, i.e., whether or not the parameter control data $a_1$ through $a_N$ can be obtained.

That is to say, Expression (30) cannot be solved with regard to matrix A unless learning information obtained from a predetermined number of learning pairs or more exists, and the parameter control data $a_1$ through $a_N$ serving as the components thereof cannot be obtained. Accordingly, in step S75, whether or not the parameter control data $a_1$ through $a_N$ can be obtained from the learning information is judged.

In step S75, in the event that judgment is made that the parameter control data $a_1$ through $a_N$ cannot be obtained, the parameter control data calculating unit 34 supplies information to that effect to the judgment control unit 36, of the flow proceeds to step S79. In step S79, the judgment control unit 36 supplies auto mode data representing the auto mode to the parameter control data memory 37 as parameter control data, where it is stored. The flow then returns to step S71, and subsequently, the same processing is repeated.

Accordingly, in the event that sufficient learning information for obtaining the parameter control data $a_1$ through $a_N$ does not exist, the weight obtained from the input reliability based on dispersion of input signals is used for correction of the input signals x(t), as described with reference to FIG. 11.

On the other hand, in the event that judgment is made in step S75 that the parameter control data can be obtained, the flow proceeds to step S76, where the parameter control data calculating unit 34 obtains the parameter control data $a_1$ through $a_N$ by solving Expression (30) with regard to matrix A using learning information, supplies this to the judgment control unit 36, and the flow proceeds to step S77.

At step S77, the judgment control unit 36 follows the Expression (23) defined by the parameter control data $a_1$ through $a_N$ from the parameter control data calculating unit 34 to obtain a prediction value of corresponding tutor data from the student data stored in the learning data memory 33, and obtains the sum of the square-error represented by Expression (26), of the prediction error (the error as to the tutor data stored in the learning data memory 33) of that prediction value. Further, the judgment control unit 36 obtains a normalization error wherein the square-error sum is divided by the number of learning pairs stored in the learning data memory 33, for example, and the flow proceeds to step S78.

In step S78, the judgment control unit 36 judges whether or not the normalization error is greater than (equal to or more than) a predetermined threshold value S1. In the event that judgment is made in step S78 that the normalization error is greater than the predetermined threshold value S1, i.e., in the event that the linear expression in the Expression (23) defined by the parameter control data $a_1$ through $a_N$ does not precisely approximate the relation between the student data and the tutor data stored in the learning data memory 33, the flow proceeds to step S79, and the judgment control unit 36 supplies auto mode data representing the auto mode to the parameter control data memory 37 as parameter control data, where it is stored. The flow then returns to step S71, and subsequently, the same processing is repeated.

Accordingly, even in the event that the parameter control data $a_1$ through $a_N$ can be obtained, in the event that the Expression (23) defined by the parameter control data $a_1$ through $a_N$ does not precisely approximate the relation between the student data and the tutor data stored in the learning data memory 33, the weight obtained by input reliability based on dispersion of input signals is used for correcting the input signals x(t), in the same way as cases wherein sufficient learning information for obtaining the parameter control data $a_1$ through $a_N$ does not exist.

On the other hand, in the event that judgment is made step S78 that the normalization error is not greater than the predetermined threshold value S1, i.e., in the event that the linear expression in the Expression (23) defined by the parameter control data $a_1$ through $a_N$ does precisely approximate the relation between the student data and the tutor data stored in the learning data memory 33, the flow proceeds to step S80, and the judgment control unit 36 obtains the error (distance) ϵ between the plane (line) of the Expression (23) defined by the parameter control data $a_1$ through $a_N$ and the point stipulated by the newest tutor data and student data stored in the learning data memory 33.

The flow then proceeds to step S81, where the judgment control unit 36 judges whether or not the magnitude of the error ϵ is greater than (equal to or more than) a predetermined threshold value S2, and in the event that judgment is made that this is not greater, step S82 is skipped, the flow proceeds to step S83, and the judgment control unit 36 outputs the parameter control data $a_1$ through $a_N$ obtained in step S76 to the parameter control unit data memory 37. The parameter control data memory 37 stores the parameter control data $a_1$ through $a_N$ from the judgment control unit 36 in the form of overwriting, the flow returns to step S71, and subsequently, the same processing is repeated.

On the other hand, in the event that judgment is made in step S81 that the magnitude of the error ϵ is greater than the predetermined threshold value S2, the flow proceeds to step S82, where the judgment control unit 36 controls the parameter control data calculating unit 34 to re-calculate the parameter control data $a_1$ through $a_N$ using only the newest tutor data and student data stored in the learning data memory 33. The flow then proceeds to step S83, where the judgment control unit 36 outputs the parameter control data $a_1$ through $a_N$ obtained in step S82 to the parameter control data memory 37, where it is stored in the form of overwriting, and the flow returns to step S71.

That is, in the embodiment shown in FIG. 12 as well, the error ϵ between the plane defined by Expression (23) from the parameter control data $a_1$ through $a_N$ obtained from the tutor data and student data provided so far and the point stipulated by the newest tutor data and student data is obtained in step S82, in the same manner as with the embodiment in FIG. 7.

In the event that the magnitude of the error ϵ is not greater than the predetermined threshold value S2, the plane defined by Expression (23) from the parameter control data $a_1$ through $a_N$ obtained in step S76 is considered to relatively precisely approximate all of the points stipulated by tutor data and student data provided so far, including the point stipulated by the newest tutor data and student data, so this parameter control data $a_1$ through $a_N$ is stored in the parameter control data memory 37.

On the other hand, in the event that, the magnitude of the error ϵ is greater than the predetermined threshold value S2, the plane of Expression (23) defined by the parameter control data $a_1$ through $a_N$ obtained in step S76 is considered to relatively greatly deviate from the points stipulated by the newest tutor data and student data, so the judgment control unit 36 controls the parameter control data calculating unit-34 so as to re-calculate the parameter-control data $a_1$ through $a_N$ in step S82 using only the newest tutor data and student data stored in the learning data memory 33.

With the NR circuit shown in FIG. 9, the input reliability $\alpha_{x(t)}$ is calculated following Expression (22) at the input reliability calculating unit 41, from the parameter control data $a_1$ through $a_N$ obtained as described above.

Accordingly, in this case as well, learning is performed of the parameter control data $a_1$ through $a_N$ stipulating the input reliability $\alpha_{x(t)}$ in Expression (22), based on learning operating signals supplied according to operations of the user, so the operations made by the user can be learned without the user knowing, and further, optimal processing for the user can be performed using the results of learning.

Also, with the NR circuit in FIG. 9, as with the NR circuit in FIG. 3, upon the user operating the operating unit 3, the operating signal processing unit 30 outputs weight representing operating signals corresponding to the operating thereof, and the selecting unit 21 selects the weight and supplies this to the correcting unit 1. In this case, the correction processing represented with the Expression (8) is performed at the correcting unit 1, using the weight corresponding to the user operations. In the event that the weight w(t) in Expression (8) is to be changed by user operations, the contents of the processing (correction processing) represented with Expression (8) is also changed as a matter of course, with the NR circuit in FIG. 9 as well, the "the contents of processing" are changed following operations made by the user so that output signals desired by the user are obtained.

Further, with the NR circuit in FIG. 9, in cases wherein the parameter control data $a_1$ through $a_N$ cannot be obtained, or in cases wherein this can be obtained but the Expression (23) defined by the parameter control data $a_1$ through $a_N$ does not precisely approximate the relation between the student data and tutor data stored in the learning data memory 33, weight obtained from input reliability based on dispersion of input signals is used for correction processing at the correcting unit 1. On the other hand, in the event that the parameter control data $a_1$ through $a_N$ is obtained, and the Expression (23) defined by the parameter control data $a_1$ through $a_N$ precisely approximates the relation between the student data and tutor data stored in the learning data memory 33, the weight obtained from the input signals and the parameter control data $a_1$ through $a_N$ (rather, the input reliability calculated to have therefrom) and output reliability is used for correction processing at the correcting unit 1 following the Expression (23) defined by the parameter control data $a_1$ through $a_N$ obtained by learning being performed using learning pairs obtained based on operations of operating unit 3 by the user.

That is, with the NR circuit in FIG. 9, as with the NR circuit in FIG. 3, the system for calculating weight to be used for correction processing changes between cases wherein sufficient numbers of learning pairs or learning pairs enabling the highly precise approximation are not obtained, and cases wherein learning pairs enabling the highly precise approximation are obtained.

Accordingly, with the NR circuit in FIG. 9 as well, the "contents of processing", and further, the "structure of processing", is also changed following user operations, whereby output signals desired by the user are output.

Now, in the above case, the parameter control data $a_1$ through $a_N$ is obtained using the output reliability $\alpha_{y(t-1)}$ as student data, with this output reliability $\alpha_{y(t-1)}$ being obtained from the input reliability $\alpha_{x(t-1)}$, as shown in Expression (5). The input reliability $\alpha_{x(t)}$ is gradually improved toward obtaining of the weight desired by the user, by the control data learning processing shown in FIG. 12 being performed, so the output reliability $\alpha_{y(t-1)}$ is also improved along with this.

Also, with the above-described case, the output reliability is set at a known value, and the input reliability is stipulated by the parameter control data $a_1$ through $a_N$, thereby obtaining parameter control data $a_1$ through $a_N$ which can yield the weight desired by the user, but conversely, an arrangement may be made wherein the input reliability is set at a known value, and the output reliability is stipulated by the parameter control data $a_1$ through $a_N$, hereby obtaining parameter control data $a_1$ through $a_N$ which can yield the weight desired by the user.

Further, an arrangement may be made wherein, for example, the output reliability is set at a known value, the input reliability is stipulated by the parameter control data $a_1$ through $a_N$, whereby parameter control data $a_1$ through $a_N$ yielding weight desired by the user can be obtained, the input reliability obtained by the parameter control data $a_1$ through $a_N$ is further made to be a known value, and the output reliability is stipulated by parameter control data $a_1'$ through $a_N'$, whereby parameter control data $a_1$ through $a_N$ yielding weight desired by the user can be obtained, i.e., two sets of parameter control data $a_1$ through $a_N$ and $a_1'$ through $a_N'$ can be obtained.

Also, in the above-described case, description has been made with the input reliability $\alpha_{x(t)}$ and the output reliability $\alpha_{y(t-1)}$ being defined to obtain the parameter control data $a_1$ through $a_N$, as shown in Expression (6), but besides this, an arrangement can be made such as, for example, shown in Expression (31) wherein the weight is defined using, besides the input reliability $\alpha_{x(t)}$ and the output reliability $\alpha_{y(t-1)}$ a correction term $\Delta\alpha$ of the input reliability $\alpha_{x(t)}$ and the output reliability $\alpha_{y(t-1)}$, so as to enable obtaining the parameter control data $a_1$ through $a_N$ and the correction term $\Delta\alpha$.

[Expression 31]

$$w(t) = \frac{\alpha_{y(t-1)} + \Delta\alpha}{\alpha_{y(t-1)} + \Delta\alpha + \alpha_{x(t)}} \tag{31}$$

Further, the expression for defining the input reliability by the parameter control data is not restricted to the Expression (22).

Figure 13:
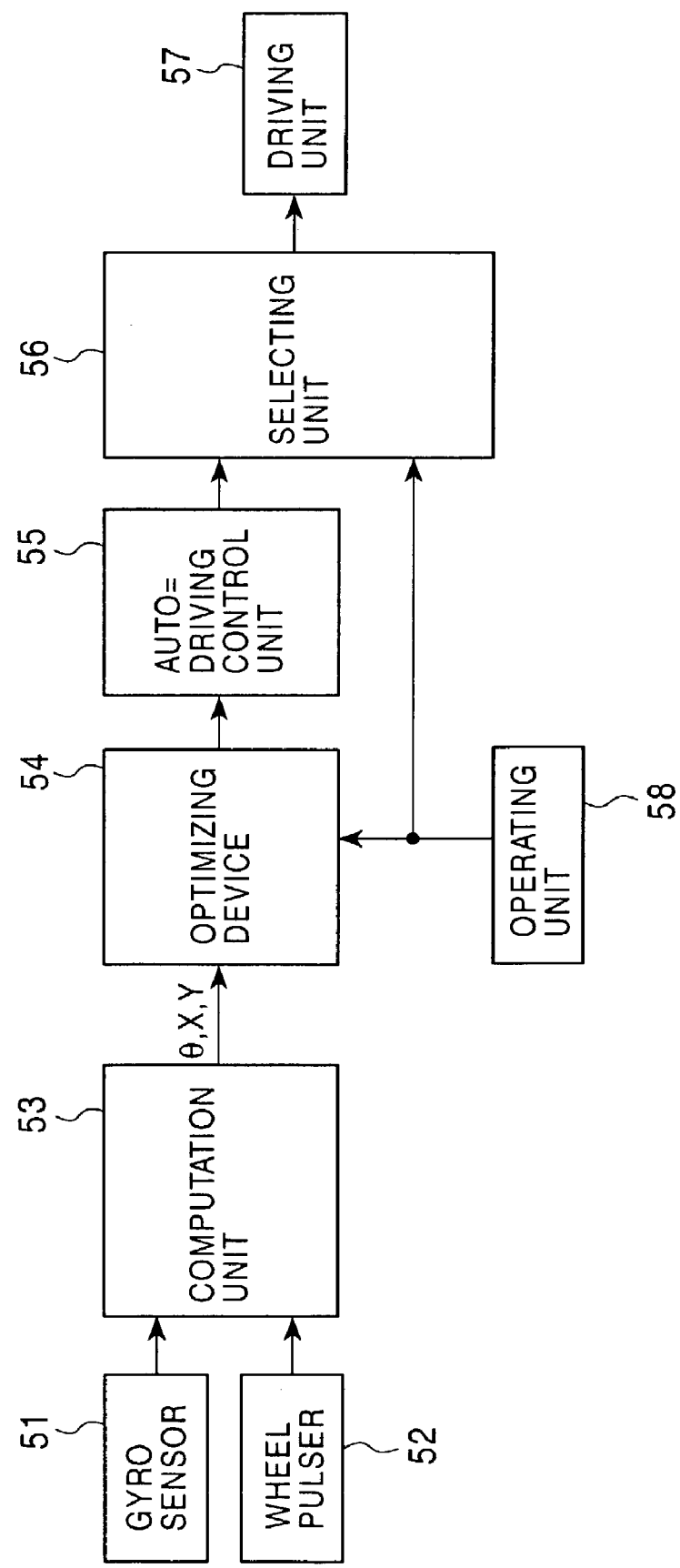
FIG. 13 is a block diagram illustrating a configuration example of an embodiment of an automatic driving device to which the present invention has been applied.

Next, FIG. 13 illustrates the configuration example of an embodiment of an auto-driving device for an automobile, to which the optimizing device shown in FIG. 1 has been applied.

With the auto-driving device, the location coordinates (X, Y) and the direction of driving θ are obtained, and the automobile is driven following a predetermined course. However, errors are often contained in the location coordinates (X, Y) and the direction of driving θ obtained with the auto-driving device, and in this case, the automobile may run off of the predetermined course. Accordingly, with the auto-driving device shown in FIG. 13, the operations of the user are learned without the user knowing, and the automobile is caused to drive along the predetermined course, based on the results of learning. That is, in the event that the automobile runs off the predetermined course, generally, the user will operate the steering wheel or gas pedal to cause the automobile to run along the predetermined course. Accordingly, the auto-driving device shown in FIG. 13 effects control such that the operations of the user are learned without the user knowing, and the automobile is caused to gradually come to drive along the predetermined course, based on the results of learning.

A gyro sensor 51 detects a yaw rate r of the automobile, and supplies this to a computing unit 53. A wheel purser 52 supplies electric pulses of a number corresponding to the rotational angle of the wheels of the automobile, to the computing unit 53.

The computing unit 53 computes the location coordinates (X, Y) and the direction of driving θ from the output of the gyro sensor 51 and wheel pulser 52, following the following expression, for example, and supplies this to the optimizing device 54.

[Expression 32]

$$\theta = \theta(0) + \int r\,dt$$

$$X = X(0) + \int V_r \cos(\theta + \beta)\,dt$$

$$Y = Y(0) + \int V_r \sin(\theta + \beta)\,dt \tag{32}$$

Note that in Expression (32), θ(0) represents the direction of the automobile at the time of starting driving, and (X(0), Y(0)) represent the coordinates of the automobile at the time of starting driving. Also, θ(0) and (X(0), Y(0)) may be obtained using an unshown GPS (Global Positioning System)

or the like. Further, $V_r$ represents the driving speed of the automobile, and β represents the slip angle of the center of gravity of the automobile.

Now, how to obtain the coordinates (X, Y) and driving direction θ as described above is disclosed in, for example, Japanese Unexamined Patent Application Publication No. 10-69219.

The optimizing device 54 learns the operations which the user makes with operating unit 58, i.e., performs learning based on operating signals supplied by the user operating the operating unit 58, corrects the coordinates (X, Y) and driving direction θ from the computing unit 53 so that driving which the user desires is performed, based on the results of learning, and supplies this to the auto-driving control unit 55.

The auto-driving control unit 55 stores map data and a course which has been set beforehand for auto-driving (hereafter may be referred to as a set course). The auto-driving control unit 55 recognizes the current position and driving direction of the automobile from the coordinates (X, Y) and driving direction θ supplied from the optimizing device 54, and generates control signals for controlling a later-described the driving unit 57, so that the automobile follows the set course for driving, and outputs this to the selecting unit 56.

The selecting unit 56 is supplied with control signals from the auto-driving control unit 55, and is also supplied with operating signals from the operating unit 58. Of the control signals from the auto-driving control unit 55 and the operating signals from the operating unit 58, the selecting unit 56 selects the operating signals with higher priority, and outputs these to the driving unit 57, that is, the selecting unit 56 normally selects the control signals from the auto-driving control unit 55 and outputs these to the driving unit 57, but upon receiving operating signals from the operating unit 58, stops output of the control signals from the auto-driving control unit 55 while operating signals are being received, and outputs the operating signals from the operating unit 58 to the driving unit 57.

The driving unit 57 follows control signals or operating signals from the selecting unit 56, and drives the mechanisms of the automobile which are necessary for driving, such as an unshown engine, wheels, brakes, clutch, etc. The operating unit 58 is configured of, for example, the steering wheel, gas pedal, brake pedal, clutch pedal, etc., and supplies operating signals corresponding to operations made by the user, to the optimizing device 54 and selecting unit 56.

With the auto-driving device configured as described above, at the computing unit 53, the current coordinates (X, Y) and driving direction θ of the automobile are computed from the output of the gyro device 51 and wheel pulser 52, and supplied to the auto-driving control unit 55 via the optimizing device 54. The auto-driving control unit 55 recognizes the current position and driving direction of the automobile from the coordinates (X, Y) and driving direction θ supplied thereto, generates control signals for controlling the later-described driving unit 57 so that the automobile drives following the set course, and supplies these to the driving unit 57 via the selecting unit 56. Thus, the automobile performs auto-driving following the control signals which the auto-driving control unit 55 outputs.

On the other hand, upon the user operating the operating unit 58, operating signals corresponding to the operation thereof are supplied to the driving unit 57 via the selecting unit 56, whereby the automobile drives following the operations which the user makes at the operating unit 58.

Further, due to the user operating the operating unit 58, operating signals which operating unit 58 outputs are supplied to the optimizing device 54 as well. The optimizing device 54 performs learning based on operating signals supplied by the user operating the operating unit 58. Upon the user stopping the operations of the operating unit 58, the optimizing device 54 then makes corrections to the coordinates (X, Y) and driving direction θ so that driving is performed following the set course as the driving which the user desires, based on the results of learning, and supplies this to the auto-driving control unit 55.

Figure 14:
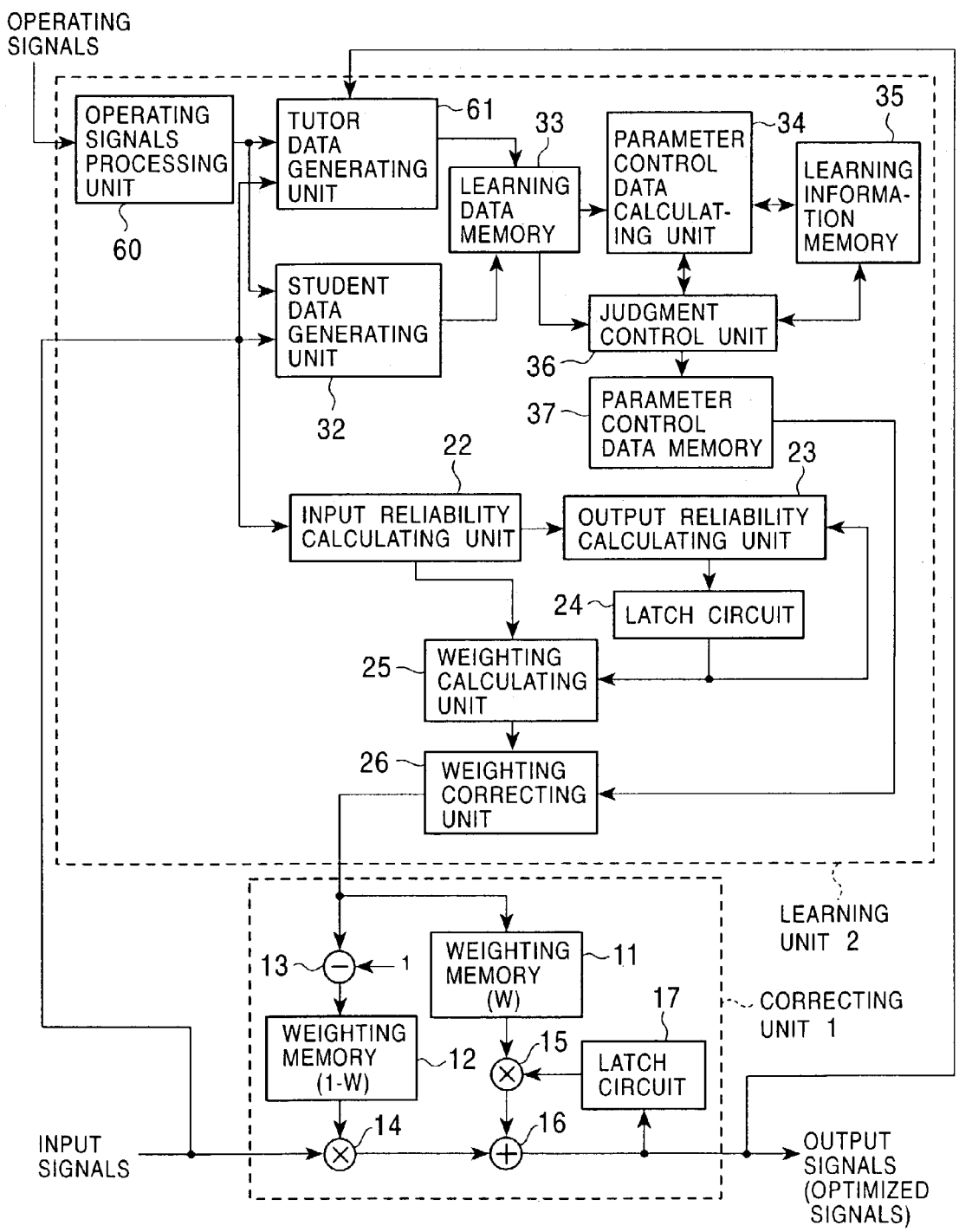
FIG. 14 is a block diagram illustrating a configuration example of an optimizing device 54.

Next, the FIG. 14 illustrates a configuration example of optimizing device 54 in FIG. 13. In the figure, the parts corresponding to those shown in FIG. 3 are denoted with the same reference numerals, and description thereof will be omitted where suitable in the following. That is, the optimizing device 54 shown in FIG. 14 is configured basically the same as that shown in FIG. 3 except that no selecting unit 21 is provided, and an operating signal processing unit 60 and tutor data generating unit 61 are provided instead of the operating signal processing unit 30 and tutor data generating unit 31, respectively.

Now, to facilitate description in the following, of the coordinates (X, Y) and driving direction θ supplied from the computing unit 53 to the optimizing device 54, description will be made giving consideration to the driving direction θ alone. However, the coordinates (X, Y) may be subjected to the same processing as the driving direction θ to be described now.

The operating signal processing unit 60 receives operating signals from the operating unit 58, and judges whether or not these are learning operating signals. In the event the operating signals are learning operating signals, the operating signal processing unit 60 then supplies a message to that effect to the student data generating unit 32 and tutor data generating unit 61.

The tutor data generating unit 61 is arranged so as to be supplied with messages from the operating signal processing unit 60 to the effect that the operating signals are learning operating signals (hereafter may be referred to as learning messages), and also so as to be supplied with the driving direction θ from the computing unit 53, serving as input signals. Further, the driving direction θ from the computing unit 53 which has been corrected (hereafter may be referred to as corrected driving direction), is also supplied to the tutor data generating unit 61 as output signals output from the correcting unit 1 (computing device 16). The tutor data generating unit 61 obtains the weight W corresponding to the learning operating signals, from the driving direction θ serving as input signals supplied at the time of receiving the learning message, and the corrected driving direction serving as output signals, which is supplied to the learning data memory 33 as tutor data.

That is, in this case, it is necessary to obtain, as tutor data, the weight W at the point of the automobile heading in a predetermined direction following the user operating the operating unit 58 which is the steering wheel so that the automobile heads in a predetermined direction. That is, it is necessary to employ as tutor data the weight W used for correction of the input signals x(t) indicating the driving direction θ, immediately following the user operating the operating unit 58 serving as the steering wheel and the automobile heading in the predetermined direction. The input signals x(t) immediately following operation of the operating unit 58 are corrected, following Expression (8), into output signals y(t) immediately following operating the operating unit 58 by weighted addition of the input signals x(t) and the output signals y(t−1) output immediately before operating the operating unit 58, so the weight W used for correction of the input signals x(t) immediately following operation of the operating unit 58 can be obtained from Expression (8), from the input signals x(t) immediately following operation of the operating unit 58, and output signals y(t) immediately following operating the operating unit 58 and output signals y(t−1) output immediately before operating the operating unit 58. Accordingly, the tutor data generating unit 61 obtains the weight W from the driving direction θ serving as the input signals x(t) supplied immediately following a reception of the learning message, and the corrected driving direction which is the output signals y(t−1) and y(t) supplied immediately before and immediately following reception of the learning message, respectively, and supplies this to the learning data memory 33.

Also, upon receiving the learning message, the student data generating unit 32 supplies the weight w obtained from the driving direction which is the input signals supplied to immediately before that point, to the learning data memory 33, as student data.

That is, as described with reference to FIG. 3, the student data generating unit 32 is configured in the same way as the input reliability calculating unit 22, output reliability calculating unit 23, catch circuit 24, and weight calculating unit 25, and calculates the weight w of the driving direction which is the input signals supplied thereto (the same weight w that is obtained at the weight calculating unit 25), and supplies the weight w calculated immediately before receiving the learning message to the learning data memory 33, as student data.

Accordingly, at the parameter control data calculating unit 34, the weight W at the point that the user operates the operating unit 58 and the driving direction becomes the direction which the user desires is taken as tutor data, and the same weight w as that which the weight calculating unit 25 output immediately before the user operating the operating unit 58 is taken as student data, and the parameter control data a and b shown in the Expressions(20) and (21) is performed.

Then, at the weight correcting unit 26, the weight w obtained at the weight calculating unit 25 is corrected following Expression (13), using the parameter control data a and b, and this is supplied to the correcting unit 1.

As a result, the parameter control data a and b serve to correct the weight w obtained at the weight calculating unit 25 so as to correct the driving direction immediately before the user operating the operating unit 58 to the driving direction immediately following the user operating the operating unit 58, so the automobile performs auto-driving along the set course.

That is, it can be considered that the fact that the user operates the operating unit 58 means that the driving direction θ which the computing unit 53 outputs contains error due to error in the gyro sensor 51 or noise in the output thereof, computation error in the computing unit 53, etc., and accordingly does not represent the true driving direction of the automobile, and accordingly the actual driving direction of the automobile has deviated from the set course. Further, it can be considered that the operations of the operating unit 58 made by the end user in this case are for changing the actual driving direction of the automobile to that following the set course. Accordingly, performing learning wherein the weight W at the point that the user operates operating unit 58 and the actual driving direction of the automobile follows the set course is taken as tutor data, and the weight w obtained at the weight calculating unit 25 immediately before the user operates the operating unit 58, i.e., the weight w which the weight calculating unit 25 outputs in the state of deviating from the set course, as student data, the parameter control data a and b of the Expression (13) for correcting the weight in the Expression (6), so as to correct the driving direction in the state of deviating from the set course to, a direction following the set course.

Next, description will be made regarding the optimizing device 54 shown in FIG. 14. Now, as with the NR circuit shown in FIG. 3, the optimizing device 54 shown in FIG. 14 performs control data learning processing for obtaining the parameter control data for controlling (correcting) the weight serving as correction parameters, by correction processing for correcting the driving direction θ which the computing unit 53 outputs as input signals x(t), correction parameter computing processing for obtaining the weight serving as correction parameter is to be used for the correction processing thereof, and operations of the operating device 58 (FIG. 13) by the user, but the correction processing is the same as the correction processing performed by the NR circuit shown in FIG. 3 that has been described with reference to FIG. 5, so here, the correction parameter computing processing and student data learning processing which the optimizing device 54 shown in FIG. 14 performs, will be described.

First, the correction parameter computing processing which the optimizing device 54 shown in FIG. 14 performs will be described with reference to the flowchart shown in FIG. 15.

In the correction parameter computing processing, first, in step S91, the input signals calculating unit 22 obtains the input reliability $\alpha_{x(t)}$ based on dispersion of the driving direction θ from the computing unit 53 (FIG. 13) serving as input signals, and supplies this to the output reliability calculating unit 23 and weight calculating unit 25, in the same way as with step S31 in FIG. 6.

Subsequently, the flow proceeds to step S92, where the weight calculating unit 25 uses the input reliability $\alpha_{x(t)}$ from the input reliability calculating unit 22 to obtain the weight w(t) which is supplied to the weight correcting unit 26, and the flow proceeds to step S93.

In step S93, the weight correcting unit 26 reads out the parameter control data from the parameter control data memory 37, and the flow proceeds to step S94. In step S94, the weight correcting unit 26 judges whether or not the parameter control data read out from the parameter control data memory 37 is auto mode data which represents a mode wherein the weight w(t) is not corrected, i.e., a mode wherein a weight w(t) which is obtained automatically, so as to say, from the input reliability and output reliability at the weight calculating unit 25, as the weight W for correcting the input signals x(t) without any change, regardless of operations of operating unit 58 (FIG. 13) by the user (auto mode).

In the event that judgment is made in step S93 that the parameter control data is not auto mode data, the flow proceeds to step S95, where the weight correcting unit 26 corrects the weight w(t) supplied from the weight calculating unit 25 following the linear expression in the Expression (13) defined by the parameter control data a and b supplied from the parameter control data memory 37, and the flow proceeds to step S96. In step S96, weight correcting unit 26 supplies the post-correction weight to the correcting unit 1 as correction parameters, and the flow proceeds to step S97.

On the other hand, in the event that judgment is made in step S94 that the parameter control data is auto mode data, step S95 is skipped, the flow proceeds to step S96 where the weight correcting unit 26 supplies the weight w(t) from the weight calculating unit 25 without change to the correcting unit 1 as correction parameters, and the flow proceeds to step S97.

At step S97, the output reliability calculating unit 23 updates the output reliability. That is, the output reliability calculating unit 23 adds the input reliability $\alpha_{x(t)}$ and the output reliability $\alpha_{y(t-1)}$ from one sample back which the latch circuit 24 has latched, following Expression (5), thereby obtaining the current output reliability $\alpha_{y(t)}$, which is stored in the form of overwriting on the latch circuit 24.

Following the processing and step S97, the flow returns to step S91, and subsequently the same processing is repeated.

Figure 15:
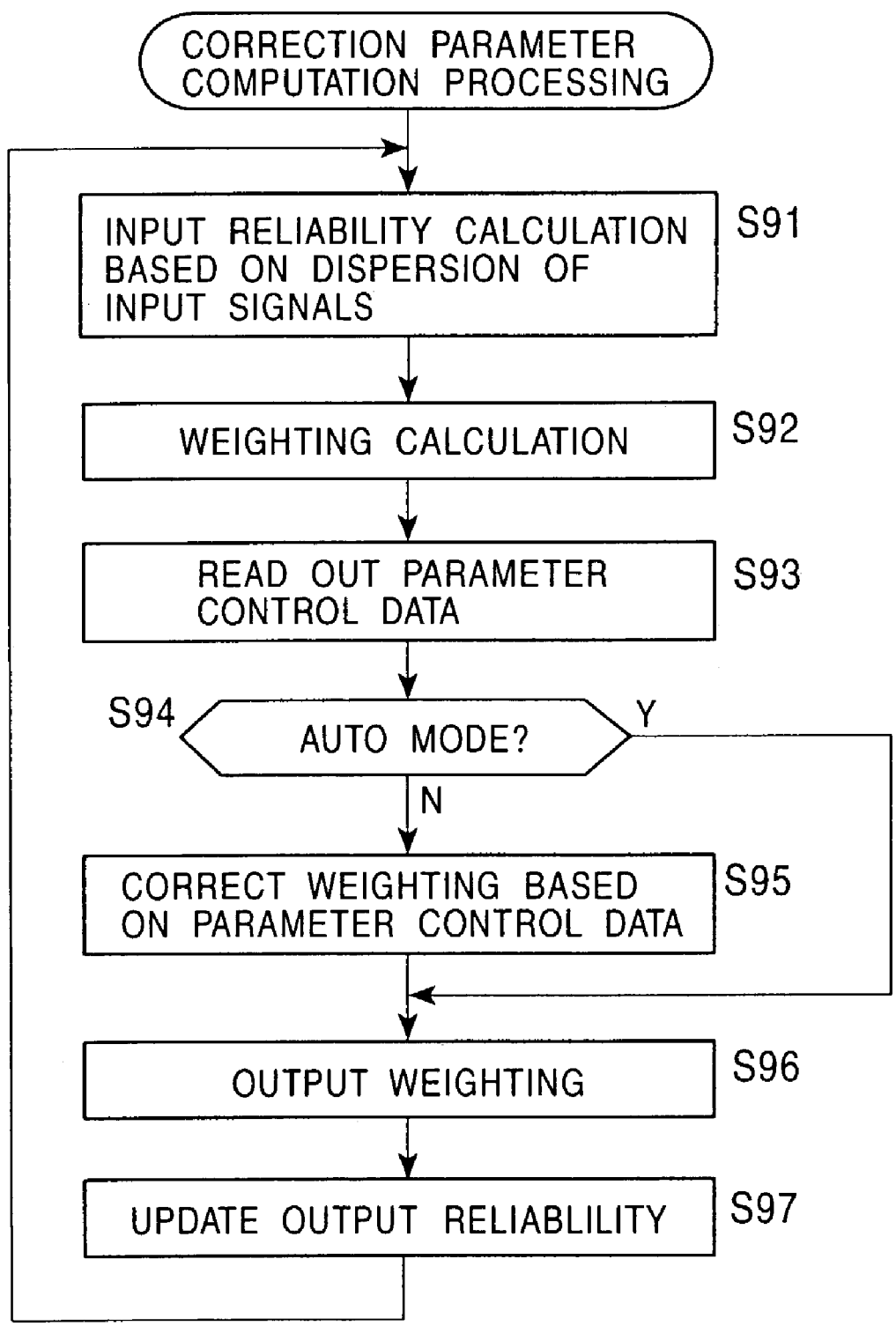
FIG. 15 is a flowchart describing correction parameter computation processing with the optimizing device 54.
Figure 16:
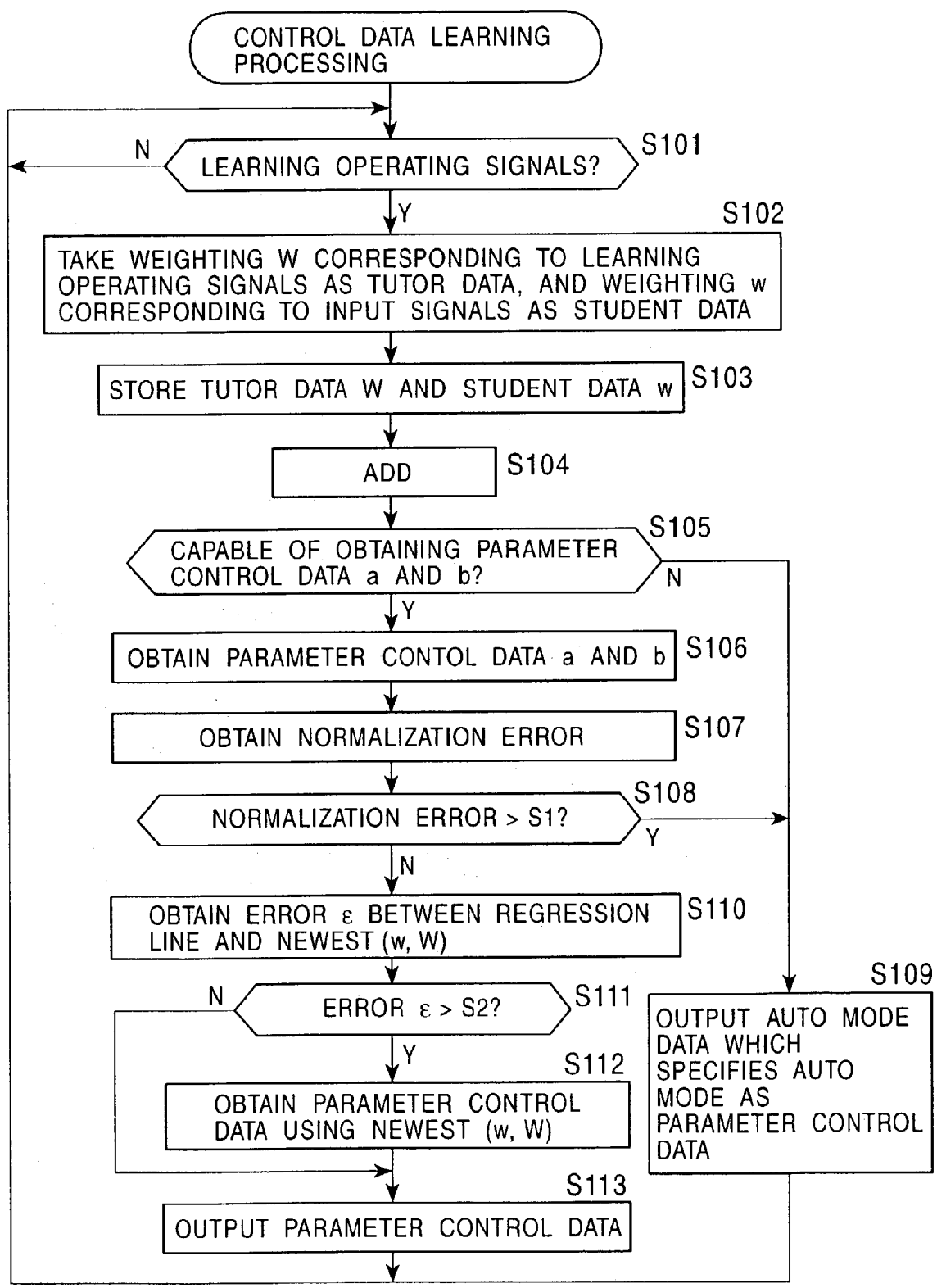
FIG. 16 is a flowchart describing control data learning processing with the optimizing device 54.

As described above, with the correction parameter computing processing shown in FIG. 15, in the event of being in a auto mode, the weight to be used for correction processing is obtained from the input reliability and output reliability regardless of the operations of the operating unit 58, and in the event of not being in the auto mode, the weight to be used for correction processing is obtained using the parameter control data obtained by the learning in the control data learning processing in FIG. 16 which will be described later, based on the operations of the operating unit 58.

Next, description will be made regarding the control data learning processing which the optimizing device 54 shown in FIG. 14 performs, with reference to the flow chart shown in FIG. 16.

With the control data learning processing, first, in step S101, the operating signal processing unit 60 judges whether or not learning operating signals have been received from the operating unit 58 (FIG. 13), and in the event that judgment is made that the signals have not been received, the flow returns to step S101.

Also, in the event that judgment is made in step S101 that learning operating signals have been received from the operating unit 58, i.e., in the event of that, for example, the steering wheel or the like which is the operating unit 58 starts to be operated, following which, without elapsing of a first time t1 or longer, operating is performed continuously for a second time t2 or longer, following which the operations thereof are stopped continuously for a third time t3 or longer, or cases wherein following starting the operations of the steering wheel which is the operating unit 58, operations thereof are stopped continuously for a third time t3 or longer, such that judgment can be made to that the user has operated the steering wheel which is operating unit 58 so as to direct the automobile in the desired direction, the flow proceeds to step S102, where the tutor data generating unit 61 generates tutor data, and the student data generating unit 32 generates student data.

That is to say, upon judging that the learning operating signals have been received, the operating signal processing unit 60 supplies a learning message to the tutor data generating unit 61 and student data generating unit 32. Upon receiving the learning message from the operating signal processing unit 60, in step S102 the tutor data generating unit 61 obtains a weight W corresponding to the learning operating signals, from the driving direction θ which is the input signals supplied from the computing unit 53, and the corrected driving-direction θ from the computing unit 53 (corrected driving direction) which is the output signals output by the correcting unit 1 (computing device 16).

Specifically, the tutor data generating unit 61 receives input signals x(t) representing the driving direction θ immediately following the user operating the operating unit 58 serving as the steering wheel and the automobile heading in the desired direction, from the computing unit 53 (FIG. 13). Further, the tutor data generating unit 61 is arranged so as to hold the current output signals y(t) output by the correcting unit 1, and output signals y(t−1) from one timing back, i.e., the output signals y(t−1) immediately before operating the operating unit 58, and obtains the weight W used at the correcting unit 1 at the time that the learning operating signals are provided to (the weight corresponding to the learning operating signals) following Expression (8), using the input signals x(t), and output signals y(t) and y(t−1).

Note that in this case, operations of the steering wheel which is the operating unit 58 made by the user are considered to be instantaneously completed within one timing from t−1 to t, to facilitate description.

The tutor data generating unit 61 obtains the weight W corresponding to the learning operating signals as described above, and then supplies the weight W to the learning data memory 33 as tutor data.

Further, in step S102, the student and data generating unit 32 which has received the learning message from the operating signal processing unit 60 supplies the same weight w as that output by the weight calculating unit 25, calculated using the input reliability and output reliability and obtained from the driving direction which is input signals supplied from the computer unit 53 (FIG. 13), to the learning data memory 33, as student data.

Accordingly, the learning data memory 33 is supplied with a learning pair, wherein the weight W used at the correcting unit 1 at the point that the actual driving direction of the automobile becomes the direction which the user desires, is taken as tutor data, and the weight w obtained from the input reliability and output reliability immediately before the user operating the operating unit 58, is taken as student data.

Upon receiving the tutor data W from the tutor data generating unit 61 and the student data w from the student data generating unit 32, the learning data memory 33 stores the set of the newest tutor data W and student data w in step S103, and the flow proceeds to step S104.

In step S104, the parameter control data calculating unit 34 performs adding in the least-square, with regard to the newest tutor data and student data stored in the learning data memory 33 and to the learning information stored in the learning information memory 35, in the same way as with step S44 in FIG. 7. Further, in step S104, the parameter control data calculating unit 34 stores the adding-in results as learning information, in the form of overwriting the learning information memory 35, and the flow proceeds to step S105.

In step S105, the parameter control data calculating unit 34 judges whether or not the parameter control data a and b can be obtained with the Expressions (20) and (21), from the adding-in results serving as the learning information stored in the learning information memory 35, as with the case in step S95 in FIG. 7.

In the event that judgment is made in step S105 that the parameter control data a and b cannot be obtained, the parameter control data calculating unit 34 supplies the judgment control unit 36 with information to that effect, and the flow proceeds to step S109. In step S109, but judgment control unit 36 supplies the auto mode data representing the auto mode to the parameter control data memory 37 as parameter control data, where it is stored. Then, the flow returns to step S101, and subsequently, the same processing is repeated.

Accordingly, in the event that sufficient learning information whereby the parameter control data a and b can be obtained does not exist, the weight w(t) automatically obtained from the input reliability and output reliability at the weight calculating unit 25 (FIG. 14) is used for correction of input signals x(t) without change.

On the other hand, in the event that judgment is made in step S105 that the parameter control data a and b can be obtained, the flow proceeds to step S105, where the parameter control data calculating unit 34 uses learning information to calculate the Expressions (20) and (21), and thereby obtaining the parameter control data a and b, which is supplied to the judgment control unit 36, and the flow proceeds to step S107.

In step S107, the judgment control unit 36 follows the linear expression in Expression (13) defined by the parameter control data a and b from the parameter control data calculating unit 34 to obtain prediction values of a corresponding tutor data from the student data stored in the learning data memory 33, and obtains the sum of the square-error represented by the Expression (15) for the prediction error of that prediction value (error as to the tutor data stored in the learning data memory 33). Further, the judgment control unit 36 obtains a normalization error wherein the square-error sum is divided by the number of the learning pairs stored in the learning data memory 33, for example, and the flow proceeds to step S108.

In step S108, the judgment control unit 36 judges whether or not the normalization error is greater than (equal to or more than) a predetermined threshold value S1. In the event that judgment is made in step S108 that the normalization error is greater than the predetermined threshold value S1, i.e., in the event that the linear expression in the Expression (13) defined by the parameter control data a and b does not precisely approximate the relation between the student data and the tutor data stored in the learning data memory 33, the flow proceeds to step S109 where the judgment control unit 36 supplies auto mode data representing the auto mode to the parameter control data memory 37 as parameter control data, where it is stored. The flow then returns to step S101, and subsequently, the same processing is repeated.

Accordingly, even in the event that the parameter control data a and b can be obtained, in the event that the linear expression in the Expression (13) defined by the parameter control data a and b does not precisely approximate the relation between the student data and the tutor data stored in the learning data memory 33, the weight w(t) automatically obtained from the input reliability and output reliability is used for correcting the input signals x(t), in the same way as cases wherein sufficient learning information for obtaining the parameter control data a and b does not exist.

On the other hand, in the event that judgment is made in step S108 that the normalization error is not greater than the predetermined threshold value S1, i.e., in the event that the linear expression in the Expression (13) defined by the parameter control data a and b does precisely approximate the relation between the student data and the tutor data stored in the learning data memory 33, the flow proceeds to step S110, wherein the judgment control unit 36 obtains the error (distance) ε between the regression line represented by the linear expression in the Expression (13) defined by the parameter control data a and b from the parameter control data calculating unit 34 and a point stipulated by the newest tutor data and student data stored in the learning data memory 33.

The flow then proceeds to step S111, where the judgment control unit 36 judges whether or not the magnitude of the error ε is greater than (equal to or more than) a predetermined threshold value S2, and in the event that judgment is made that this is not greater, step S112 is skipped, the flow proceeds to step S113, and the judgment control unit 36 outputs the parameter control data a and b obtained in step S106 to the parameter control data memory 37. The parameter data memory 37 stores the parameter control data a and b from the judgment control unit 36 in the form of overwriting, and the flow returns to step S101.

On the other hand, in the event that judgment is made in step S111 that the magnitude of the error ε is greater than the predetermined threshold value S2, the flow proceeds to step S112, where the judgment control unit 36 controls the parameter control data calculating unit 34 to re-calculate the parameter control data a and b using only a predetermined number of the newest learning pairs of newest tutor data and student data stored in the learning data memory 33 (without using the learning information in the learning information memory 35). The flow then proceeds to step S113, where the judgment control unit 36 outputs the parameter control data a and b obtained in step S112 to the parameter control data memory 37, where it is stored in the form of overwriting, and the flow returns to step S101.

Accordingly, in the event that the parameter control data a and b can be obtained, and linear expression of the Expression (13) defined by the parameter control data a and b precisely approximates the relation between the student data and tutor data stored in the learning data memory 33, the weight w(t) obtained from the input reliability and output reliability is corrected following the Expression (13) defined by the parameter control data a and b obtained by the learning being performed using the learning pairs obtained based on the operations of the operating unit 3 by the user, and the corrected weight w obtained by the correction is used for correcting the input signals x(t).

As described above, with the auto-driving device shown in FIG. 13 as well, judgment is made regarding whether or not the operating signals supplied in response to operations, of the user can be used for learning, and in the event that these are learning operating signals which can be used for learning, the parameter control data a and b for correcting the weight for correcting the input signals is learned based on the learning operating signals, so the operations of the user can be learned without the user knowing, and consequently, processing suitable for the user gradually comes to be performed based on the results of learning, and ultimately, processing optimal for the user is performed.

That is, as the user performs operations with operating unit 58 so as to correct the driving direction to follow the set course, the automobile gradually comes to perform auto-driving following the set course.

Also, in the same manner as the NR circuit shown in FIG. 3, with the optimizing device 54 shown in FIG. 14 as well, the weight W used for the correction processing (FIG. 5) performed at the correcting unit 1 is changed, following the operations of the user at the operating unit 58, so that the actual driving direction of the automobile follows the set course. That is to say, upon the user operating the operating unit 58 so that the driving direction of the automobile heads in the desired direction, the driving direction θ which is input signals output by the computing unit 53 (FIG. 13) changes, so the input reliability obtained from the driving direction θ, and further the output reliability obtained from the input reliability, change. The change in this input reliability and output reliability causes the weight obtained at the weight calculating unit 25 to change, and this changed weight is supplied to the correcting unit 1 through the weight correcting unit 26. The correction processing represented by Expression (8) is then performed at the correcting unit 1, using the weight that has been supplied. Accordingly, in the event that the user operates the operating unit 58, the weight of the Expression (8) is changed by the operations of the user, and then the same manner as the case described with the NR circuit in FIG. 3, the contents of the processing (correction processing) represented by Expression (8) also change as a matter of course, so it can be said that the "contents of processing" are being changed so that the driving direction desired by the user can be obtained, following operations of the user, with optimizing device 54 shown in FIG. 14, as well.

Further, as with the NR circuit in FIG. 3, with the optimizing device 54 shown in FIG. 14 as well, in cases wherein sufficient learning pairs have not been input from the user, or in the event that learning pairs whereby highly precise approximation is possible have not been input, weight automatically obtained from the input reliability and output reliability is used for the correction processing at the correcting unit 1, and in the event that learning pairs whereby highly precise approximation is possible have been input, correction weighting obtained by the parameter control data a and b obtained by learning being performed using the learning pairs is used for correction processing at the correcting unit 1. That is to say, the system for calculating weight used for the correction processing changes depending on the cases wherein a sufficient number of learning pairs or learning pairs enabling highly precise approximation are not obtained, and cases wherein learning pairs enabling highly precise approximation are obtained.

Accordingly, as with the NR circuit in FIG. 3, with the optimizing device 54 in FIG. 14 as well, the "contents of processing", and further, the "structure of processing", is also changed following user operations, whereby the automobile performs auto-driving in the driving direction following the set course.

Also, for example, Japanese Unexamined Patent Application Publication No. 7-13625 discloses that driving control device for work vehicles such as rice transplanters and the like, and with the driving control device, the amount of correction of control parameters in the automatic steering state is computed so that the difference between the state of operation by the user and the information based on detection results such as of the gyro sensor and the like, are reduced. Accordingly, the auto driving device shown in FIG. 13 holds in common with the driving control device described in Japanese Unexamined Patent Application Publication No. 7-13625, the point that the amount of correction of parameters for auto driving (automatic steering) changes based on operations made by the user.

However, the auto driving device shown in FIG. 13 greatly differs from the driving control device described in Japanese Unexamined Patent Application Publication No. 7-13625 which computes the amount of correction of control parameters in the auto steering state only in the event that a switch is manually switched over to a manual steering control mode, with regard to the point of judging whether or not operating signals supplied according to operations made by the user can be used for learning, and the point that, in the event that the operating signals are learning operating signals which can be used for learning, parameter control data for correcting the weighting for correcting input signals is learned based on the learning operating signals.

Due to such differences, with the driving control device described in Japanese Unexamined Patent Application Publication No. 7-13625, every time the user feels that suitable automatic steering is not being performed, the user must switch over a switch to a manual steering control mode, and following computation of the amount of correcting the control parameters, switch over the switch again to the auto steering control mode, which may leave the user with an impression of being troublesome.

Conversely, with the auto driving device shown in FIG. 13, the judgment is made regarding whether or not operating signals supplied according to operations made by the user can be used for learning, and further, in the event that these are learning operating signals which can be used for learning, parameter control data for correcting the weighting for correcting input signals is learned based on the learning operating signals, so suitable auto driving is performed even without the user performing such switching over of the switch, as described above. That is to say, learning of operations by the user is performed without the user knowing, so learning proceeds as the user corrects the driving direction, and the automobile gradually comes to drive following the set course, even without the user making operations.

Further, with the auto driving device shown in FIG. 13, the structure of processing changes corresponding to user operations, thus differing from the driving control device described in Japanese Unexamined Patent Application Publication No. 7-13625 with regard to this point as well.

Figure 17:
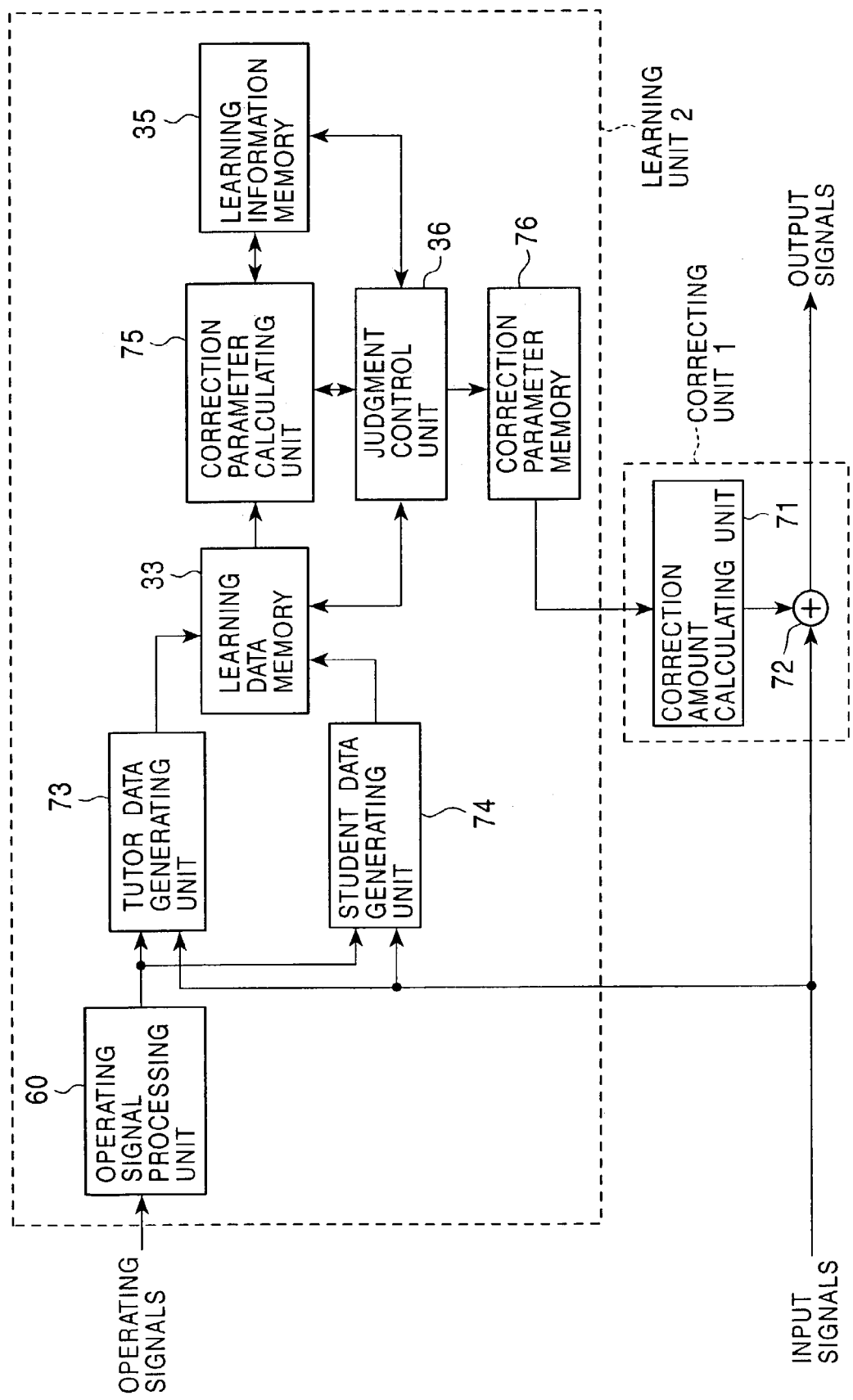
FIG. 17 is a block diagram illustrating another configuration of the optimizing device 54.

Next, FIG. 17 illustrates another configuration example of the optimizing device 54 shown in FIG. 13. Note that the parts corresponding with the case shown in FIG. 14 in the figure are denoted with the same reference numerals, and description thereof will be omitted as appropriate in the following.

With the NR circuit shown in FIG. 3 and FIG. 9, and the optimizing device 54 shown in FIG. 14, parameter control data for controlling correction parameters are learned using learning pairs obtained based on operations made by the user, but with the optimizing device 54 shown in FIG. 17, correction parameters themselves are learned using the learning pairs obtained based on operations made by the user.

That is, with the embodiment shown in FIG. 17, the correcting unit 1 is configured of a correction amount calculating unit 71 and computing device 72, and the learning unit 2 is configured of learning data memory 33, learning information memory 35, judgment control unit 36, operating signal processing unit 60, tutor data generating unit 73, student data generating unit 74, correction parameter calculating unit 75, and correction parameter memory 76.

The later-described correction parameters are supplied to the correction amount calculating unit 71 from the correction parameter memory 76 in the learning unit 2, with the correction amount calculating unit 71 using the correction parameters to calculate the correction amount for correcting the driving direction θ which is the input signals, and supplying this to the computing device 72.

The computing device 72 is supplied with correction amount from the correction amount calculating unit 71, and is also supplied with the driving direction θ which is the input signals, from the computing unit 53 (FIG. 13), with the computing unit 72 correcting the driving direction θ which is the input signals by adding the correction amount thereto, and outputting the post-correction driving direction (corrected driving direction) to the auto driving control unit 55 (FIG. 13) as output signals.

The tutor data generating unit 73 supplies the driving direction which is the input signals supplied immediately following reception of the learning message from the operating signal processing unit 60, to the learning data memory 33, as tutor data. The student data generating unit 74 supplies the driving direction which is the input signals supplied immediately before reception of the learning message from the operating signal processing unit 60, to the learning data memory 33, as student data.

The correction parameter calculating unit 75 learns correction parameter which minimizes a predetermined statistical error by computing new learning information, using tutor data and student data serving as learning data stored in the learning data memory 33, and further, if necessary, using learning information stored in learning information memory 35, and supplies this to the judgment control unit 36 under control of the judgment control unit 36. The correction parameter calculating unit 75 updates the stored contents of the learning information memory 35, with the new learning information obtained by learning.

The correction parameter memory 76 stores correction parameters which the judgment control unit 36 outputs.

With optimizing device 54 configured as described above, the driving direction θ supplied from the computing unit 53 is corrected as described next.

That is, with the yaw rate output by the gyro sensor 51 (FIG. 13) at a time t as r', the driving direction is calculated at the computing unit 53 from an expression wherein r in Expression (32) is substituted with r'.

Now, with the error contained in the yaw rate r' output by the gyro sensor 51 as $e_r$, and the true yaw rate as r, the yaw rate r' output by the gyro sensor 51 is represented by the following expression.

[Expression 33]

$$r'=r+e_r \quad (33)$$

At the computing unit 53, the driving direction θ' calculated from the yaw rate r' output from the gyro sensor 51 is as follows, from the Expressions (32) and (33).

[Expression 34]

$$\theta' = \theta(0) + \int r'dt \quad (34)$$
$$= \theta(0) + \int (r + e_r)dt$$
$$= \theta(0) + \int rdt + \int e_r dt$$

Accordingly, relation between the driving direction θ' obtained by the computing unit 53 and the true driving direction θ obtained from the true yaw rate r is as shown in the following expression.

[Expression 35]

$$\theta'=\theta+\int e_r dt \quad (35)$$

In the event that the error $e_r$ contained in the yaw rate r' output by the gyro sensor 51 is white, the second term of the right-hand side of Expression (35) is 0 in the long term, as shown in the following expression, so there is no particular problem. In the short term, the second term of the right-hand side of Expression (35) is not 0, but this case can be dealt with, with the optimizing device 54 shown in FIG. 14.

[Expression 36]

$$\int e_r dt=0 \quad (36)$$

However, in the event that the error $e_r$ is colored, the error $e_r$ accumulates as time t passes, so the driving direction θ' obtained from the computing unit 53 greatly deviates from the true driving direction θ.

Figure 18:
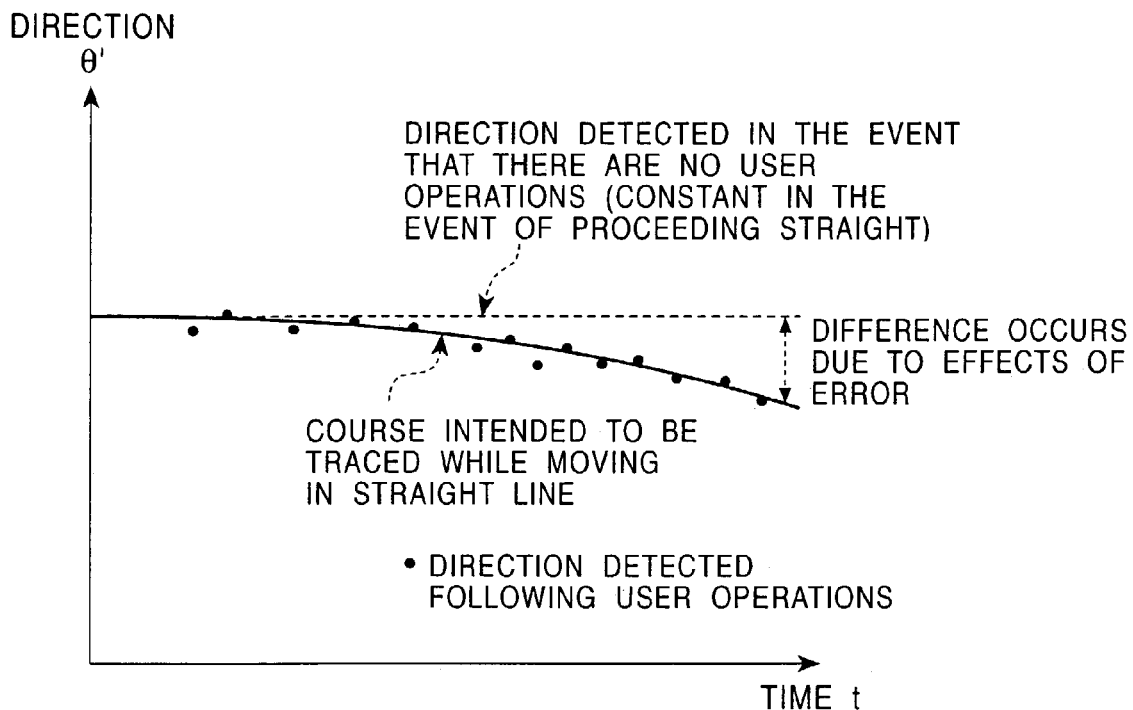
FIG. 18 is a diagram indicating the driving direction output by a computing unit 53.

That is, considering auto driving directly proceeding in a constant direction in order to simplify description, control signals which make the driving direction θ' obtained from the computing unit 53 to be constant, as indicated by the dotted line in FIG. 18, are generated at the auto driving control unit 55 (FIG. 13).

However, in the event that the error $e_r$ contained in the driving direction θ' obtained from the computing unit 53 is colored, the error $e_r$ accumulates as time t passes, so that the time that the driving direction θ' obtained from the computing unit 53 traces a course curving as indicated by the solid line in FIG. 18, for example, the automobile is proceeding straight ahead.

Accordingly, with optimizing device 54 in FIG. 17, correction parameters learning processing is performed for learning correction parameters $a_0, a_1, \ldots, a_N$, for correcting the driving direction θ' based on learning operating signals from the user, so that the driving direction θ' obtained from the computing unit 53 supplied as input signals traces the course indicated by the solid line in FIG. 18, and correction processing is performed for correcting the driving direction θ' obtained from the computing unit 53 using the correction parameters $a_0$ through $a_N$.

Figure 19:
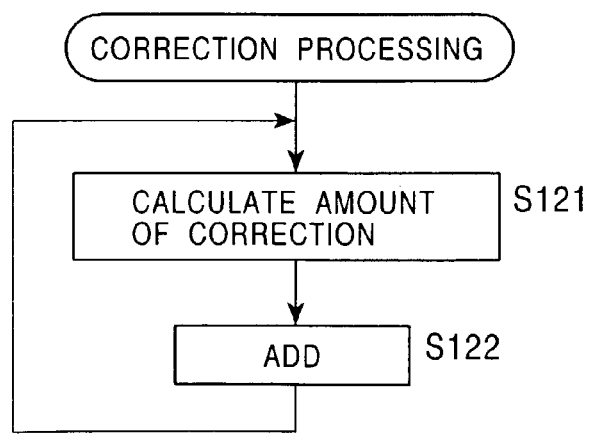
FIG. 19 is a flowchart explaining correction processing with the optimizing device 54.

Accordingly, the correction processing and correction parameter learning processing which the optimizing device 54 shown in FIG. 17 performs will be described with reference to FIG. 19 and FIG. 20. While the embodiment in FIG. 15 involves auto driving proceeding straight in a constant direction, the optimizing device 54 shown in FIG. 17 can be applied to auto driving following an arbitrary course.

First, the correction processing which the optimizing device 54 shown in FIG. 17 performs will be described with reference to the flow chart in FIG. 19.

With the correction processing, in step S121, the correction amount calculating unit 71 calculates the correction amount using the correction parameters $a_0$ through $a_N$ stored in the correction parameter memory 76.

That is, here, the correction amount is calculated with the true driving direction θ being expressed as shown in Expression (37) using the correction parameters $a_0$ through $a_N$ and the driving direction θ' obtained from the computing unit 53 as input signals, for example.

[Expression 37]

$$\theta=\theta'+a_0+a_1t^1+a_2t^2+\ldots+a_N t^N \quad (37)$$

Accordingly, $a_0+a_1t^1+a_2t^2+\ldots+a_N t^N$ is calculated at the correction amount calculating unit 71 as the correction amount, from the Expression (37). This correction amount is supplied to the computing unit 72.

In step S122, the driving direction θ' obtained from the computing unit 53 and the correction amount are added at the computing device 72, and the added value thereof (θ in Expression (37)) is output as output signals, the flow waits for a sample of the next input signals to be supplied and returns to step S122, and subsequently, the same processing is repeated.

Next, the correction parameter learning processing which the optimizing device 54 in FIG. 17 performs will be described with reference to the flowchart in FIG. 20.

With the correction parameter learning processing, first, in step S131, the operating signal processing unit 60 judges whether or not learning operating signals had been received from the operating unit 58 (FIG. 13), and in the event that judgment is made that there has been no reception thereof, the flow returns to step S131.

Also, in the event that judgment is made in step S131 that learning operating signals have been received from the operating unit 58, i.e., in the event of that, for example, the operating unit 58 starts to be operated, following which, without elapsing of a first time t1 or longer, operating is performed continuously for a second time t2 or longer, following which the operations thereof are stopped continuously for a third time t3 or longer, or cases wherein following starting of operations of the steering wheel which is the operating unit 58, operations thereof are stopped continuously for a third time t3 or longer, such that judgment can be made that the user has operated the operating unit 58 so as to direct the automobile in the desired direction, the flow proceeds to step S132, where the tutor data generating unit 73 generates tutor data, and the student data generating unit 74 generates student data.

That is to say, in the event of receiving a learning operating signal, the operating signal processing unit 60 supplies a learning message to that effect to the tutor data generating unit 73 and student data generating unit 74. Upon receiving the learning message, the tutor data generating unit 73 obtains the driving direction as input signals supplied immediately thereafter as tutor data, and supplies this to the learning data memory 33.

That is to say, in this case, for the tutor data, there is the need to use the driving direction following the user operating the operating unit 58 which is the steering wheel so that the automobile heads in the desired direction. Accordingly, the tutor data generating unit 73 supplies the driving direction θ as input signals supplied the following reception of the learning message, as tutor data, to the learning data memory 33.

Also, the student data generating unit 32, upon receiving the learning message, supplies the driving direction as input signals supplied immediately prior to this, i.e., the driving direction immediately before the automobile heads in the desired direction, as student data, to the learning data memory 33.

Following this, the flow proceeds to step S133, where the learning data memory 33 stores the set of tutor data from the tutor data generating unit 31 and the student data, and the flow proceeds to step S134.

In step S134, the same least-square adding as that described with Expressions (22) through (30) is performed by the correction parameter calculating unit 75, with regard to the tutor data and student data.

Note that the adding-in in step S134 is performed using the previous adding results stored in the learning information memory 35 as learning information, in the same manner as that described above. Also, here, adding is performed for obtaining, as θ' in Expression (37), the correction parameters $a_0$ through $a_N$ which minimize the sum of the square-error of the prediction value of the tutor data as θ in Expression (37) calculated using student data and the corresponding tutor data.

Following the adding in step S134, the correction parameter calculating unit 75 stores the adding-in results as learning information, in the form of overwriting of the learning information memory 35, and the flow proceeds to step S135.

In step S135, judgment is made regarding whether or not the correction parameter calculating unit 75 can obtain the correction parameters $a_1$ through $a_N$ from the adding results serving as learning information stored in the learning information memory 35.

In the event that judgment is made in step S135 that the correction parameters $a_1$ through $a_N$ cannot be obtained, the correction parameters calculating unit 75 supplies information to that effect to, the judgment control unit 36, and the flow proceeds to step S139. In step S139, the judgment control unit 36 supplies and stores disable data representing forbidding of correction, as correction parameters, to the correction parameter memory 76. The flow then returns to step S131, and subsequently, the same processing is repeated.

Accordingly, in the event that sufficient learning information for obtaining the correction parameters $a_1$ through $a_N$ does not exist, correction of input signals is not performed at the correcting unit 1. That is, the correction amount of input signals is 0.

On the other hand, in the event that in step S135, judgment is made that correction parameters can be obtained, the flow proceeds to step S136, where the correction parameter calculating unit 75 uses the learning information to obtain the correction parameters $a_0$ through $a_N$, supplies these to the judgment control unit 36, and the flow proceeds to step S137.

In step S137, the judgment control unit 36 obtains the prediction value of the corresponding tutor data from each of the student data stored in the learning data memory 33, following the Expression (37) defined by the parameter control data $a_1$ through $a_N$ from the correction parameters calculating unit 75, and obtains the square sum of the prediction error of that prediction value (the error as to the tutor data stored in the learning data memory 33). Further, the judgment control unit 36 obtains a normalization error wherein the square sum of the prediction error thereof is divided by the number of learning pairs stored in the learning data memory 33, for example, and the flow proceeds to step S138.

In step S138, the judgment control unit 36 judges whether or not the normalization error is greater than (equal to or more than) a predetermined threshold value S1. In the event that the judgment is made in step S138 that the normalization error is greater than the predetermined threshold value S1, i.e., in the event that the linear expression of the Expression (37) defined by the correction parameters $a_1$ through $a_N$ does not precisely approximate the relation between student data and tutor data stored in the learning data memory 33, the flow proceeds to step S139, where the judgment control unit 36 supplies and stores disable data to the correction parameter memory 76 as correction parameters, as described above. The flow then returns to step S131, and subsequently, the same processing is repeated.

Accordingly, even in the event that the correction parameters $a_1$ through $a_N$ can be obtained, in the event that the Expression (37) defined by the correction parameters $a_1$ through $a_N$ does not precisely approximate the relation between the student data and tutor data stored in the learning data memory 33, the correction amount of the input signals x(t) is 0, in the same way as cases wherein sufficient learning information for obtaining the correction parameters $a_1$ through $a_N$ does not exist.

On the other hand, in the event that judgment is made in step S138 that the normalization error is not greater than the predetermined threshold value S1, i.e., in the event that the linear expression of the Expression (37) defined by the correction parameters $a_1$ through $a_N$ precisely approximates the relation between student data and tutor data stored in the learning data memory 33, the flow proceeds to step S140, where the judgment control unit 36 obtains the error ε between a plane of the Expression (37) defined by the correction parameters $a_0$ through $a_N$ from the correction parameter calculating unit 75, and the point stipulated by the newest tutor data and student data stored in the learning data memory 33.

The flow then proceeds to step S141, where the judgment control unit 36 judges whether or not the magnitude of the error ε is greater than (equal to or more than) a predetermined threshold value S2, and in the event that judgment is made that this is not greater, step S142 is skipped, the flow proceeds to step S143, where the judgment control unit 36 outputs the correction parameters $a_0$ through $a_N$ obtained in step S136 to the correction parameters memory 76. In this case, the correction parameters memory 76 stores the correction parameters $a_0$ through $a_N$ from the judgment control unit 36 in the form of overwriting, and the flow returns to step S131.

On the other hand, in the event that judgment is made in step S141 that the magnitude of the error ε is greater than the predetermined threshold value S2, the flow proceeds to step S142, where the judgment control unit 36 controls the correction parameter calculating unit 75 to re-calculate the correction parameters $a_0$ through $a_N$, using only the newest tutor data and student data stored in the learning data memory 33. The flow then proceeds to step S143, where the judgment control unit 36 outputs the correction parameters $a_0$ through $a_N$ obtained in step S142 to the parameter control unit data memory 37, to store in the form of overwriting, and the flow returns to step S131.

Figure 20:
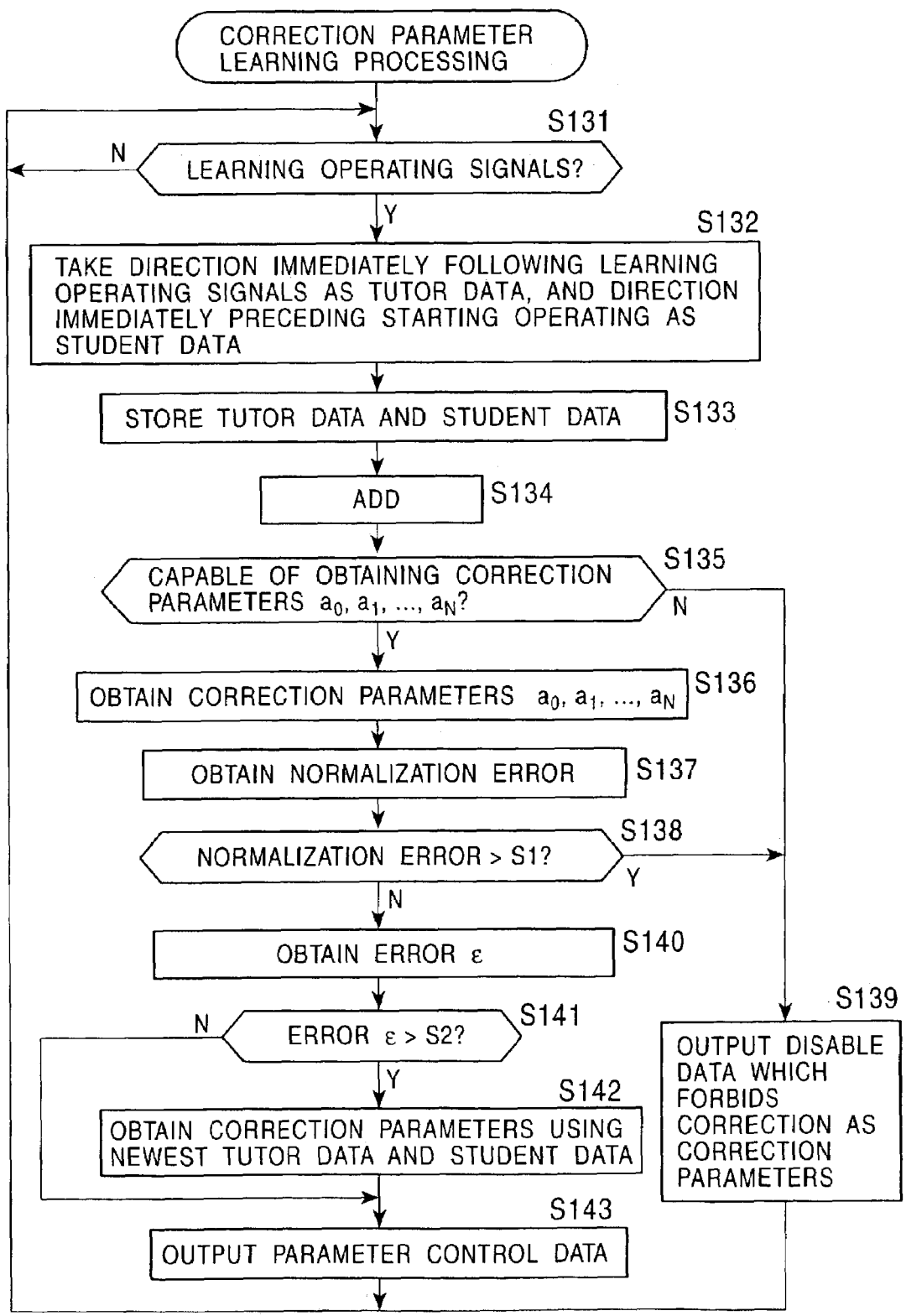
FIG. 20 is a flowchart describing correction parameter learning processing with the optimizing device 54.

That is, in the same way as the embodiment in FIG. 7, with the embodiment in FIG. 20 as well, the error $\epsilon$ is obtained between a plane defined by the Expression (37) from the correction parameters $a_0$ through $a_N$ obtained from the tutor data and student data provided so far, and the point stipulated by the newest tutor data and student data.

In the event that the magnitude of the error $\epsilon$ is not greater than the threshold value S2, the plane of the Expression (37) defined by the correction parameters $a_0$ through $a_N$ obtained in step S136 is considered to relatively precisely approximate the points stipulated by tutor data and student data provided so far, including the point stipulated by the newest tutor data and student data, so the correction parameters $a_0$ through $a_N$ are stored in the correction parameter memory 76.

On the other hand, in the event that the magnitude of the error $\epsilon$ is greater than the threshold value S2, the point stipulated by the newest tutor data and student data is considered to relatively greatly deviate from the plane of the Expression (37) defined by the correction parameters $a_0$ through $a_N$ obtained in step S136, so in step S142, the judgment control unit 36 re-calculates the correction parameters $a_0$ through $a_N$ using only the newest tutor data and student data stored in the learning data memory 33.

Accordingly, in this case as well, learning is performed for the correction parameters $a_0$ through $a_N$ of the Expression (37) based on learning operating signals supplied according to operations made by the user, so operations of the user can be learned without the user knowing, and further, processing which is optimal for the user can be performed using the learning results.

Further, in this case, in the event that the error contained in the running direction output by the computing unit 53 (FIG. 13) is colored, the automobile can be made to perform auto-driving following the predetermined set course.

Also, with optimizing device 54 in FIG. 17, the correction parameters used in the correction processing (FIG. 5) performed at the correcting unit 1 are changed so that the actual driving direction of the automobile follows the set course, following the operations of the user made at the operating unit 58. That is, upon the user operating the operating unit 58 so that the driving direction of the automobile heads in the desired direction, learning is performed of correction parameters, with each of the driving directions $\theta$ immediately before and immediately after operating of the operating unit 58 output by the computing unit 43 (FIG. 13) as input signals, as student data and tutor data, respectively, thereby changing the correction parameters. The changed correction parameters are supplied to the correcting unit 1, the correction amount is calculated at the correcting unit 1 using the correction parameters, and correction processing (FIG. 19) is performed for the input signals depending on the correction amount. Accordingly, in the event that the user operates the operating unit 58, the correction parameters of the Expression (37) are changed by the operations of the user, so that the contents of the processing (correction processing) represented by Expression (37) also change as a matter of course, so it can be said that the "contents of processing" are being changed so that the driving direction desired by the user can be obtained, following operations of the user, with the optimizing device 54 shown in FIG. 17, as well.

Further, with optimizing device 54 in FIG. 17, in the event that sufficient learning pairs are not input from the user, or in the event that learning pairs capable of highly precise approximation are not input, the correction amount of input signals at the correcting unit 1 is made to be 0, and in the event that learning pairs capable of highly precise approximation are input from the user, correction of the input signals is performed by a correction amount obtained from correction parameters obtained by learning being performed using the learning pairs. That is, the system for calculating weighting used for correction processing by the correcting unit 1 changes between cases wherein sufficient numbers of learning pairs or learning pairs capable of precise approximation are not obtained, and cases wherein learning pairs capable of highly precise approximation are obtained.

Accordingly, with optimizing device 54 in FIG. 17, as well, the "contents of processing", and further, the "structure of processing" is also changed following user operations, whereby the automobile performs auto-driving in the driving direction following the set course.

Now, with the embodiment in FIG. 20 (as with the embodiments in FIG. 7 and FIG. 12), in step S140, the error $\epsilon$ between the plane of the Expression (37) defined by the correction parameters $a_0$ through $a_N$ from the correction parameters calculating unit 75, and the point stipulated by the newest tutor data and student data, is obtained, and subsequent processing is performed, but an arrangement may be made wherein, in step S140, the error $\epsilon$ between the plane of the Expression (37) defined by the correction parameters $a_0$ through $a_N$ obtained in step S136 before multiple sets of recent tutor data and student data are supplied, and each of points stipulated by multiple sets of recent tutor data and student data, is obtained, and subsequent processing is performed based on the multiple errors $\epsilon$.

Note that the optimizing device 54 in FIG. 13 may be configured to use the optimizing device shown in FIG. 9, for example, besides those shown in FIG. 14 and FIG. 17.

Next, the above-described series of processing may be carried out by hardware, or may be carried out by software. In the event that the series of processing is carried out by software, a program making up the software is installed in a general-purpose computer or the like.

Now, FIG. 21 illustrates the configuration example of the first embodiment of a computer to which a program for executing the above-described series of processing is installed.

The program can be stored in a hard disk 105 or ROM 103 serving as recording medium built into the computer, beforehand.

Or, the program may be temporarily or permanently stored (recorded) on removable recording media 111, such as a floppy disk, CD-ROM (Compact Disc Read-Only Memory), MO (magneto-optical) disk, DVD (Digital Versatile Disk), magnetic disk, semiconductor memory, etc. Such a removable recording medium 111 can be provided as so-called packaged software.

Also, besides being installed from such a removable recording medium 111 to a computer, the program may be transferred from a download site to the computer by wireless means via a satellite for digital satellite broadcasting, or by cable via a network such as a LAN (Local Area Network) or the Internet, with the computer receiving the program transferred thus with a communication unit 108 and installing the program in a built-in hard disk 105.

The computer has a built-in CPU (Central Processing Unit) 102. An input/output interface 110 is connected to the CPU 102 via a bus 101, and upon commands being input via the input/output interface 110 by an input unit 107 configured of a keyboard, mouse, microphone, etc., operated or the like by a user, the CPU 102 executes the program stored in the ROM (Read Only Memory) 103 accordingly. Or, the CPU 102 loads to RAM (Random Access Memory) 104 and executes a program stored in the hard disk 105, a program transferred from a satellite or network and received with the communication unit 108 and installed in the hard disk 105, or a program read out from a removable recording medium 111 mounted to a drive 109 and installed to the hard disk 105. Thus, the CPU 102 performs the processing following the above-described flowchart, or the processing carried out by the configuration of the above-described block diagrams. The CPU 102 outputs the processing results from an output unit 106 configured of an LCD (Liquid Crystal Display) or speakers or the like, via the input/output interface 110, for example, or transmits from the communication unit 108, and further performs recording or the like to the hard disk 105.

Now, the various types of processing described in the specification do not necessarily need to be performed in a time-sequence following the described order in the flowcharts, and the present invention includes executing in parallel or independent processing (e.g., parallel processing or processing by objects).

Also, the program may be processed by one computer, or may be divided among and processed by multiple computers. Further, the program may be transferred to a remote computer to be executed.

While the above has been the description of applying the present invention to noise removal from input signals or auto-driving, the present invention is broadly applicable to applications other than noise removal or auto-driving, e.g., conversion of frequency properties of signals, and so forth.

INDUSTRIAL APPLICABILITY

As described above, according to the present invention, operating signals supplied according to user operations are monitored, and judgment is made whether or not these can be used for learning. In the event that the operating signals are learning operating signals which can be used for learning, a correction norm which is the norm for correcting input signals is learned, based on the learning operating signals. On the other hand, post-correction signals, wherein the input signals are corrected based on the correction norm obtained by learning, are output as output signals. Accordingly, operations made by the user are learned without the user knowing, and further, processing which is optimal for the user can be performed based on the results of learning.

The invention claimed is:

1. A signal processing device which corrects input signals and outputs output signals to control an output device to perform a predetermined function, said signal processing device comprising:
   an operating unit configured to provide operating signals according to user operations;
   a judging unit configured to monitor the operating signals and judge whether or not the operating signals are usable for learning;
   a learning unit configured to learn a correction norm which is a norm for correcting said input signals, based on learning operating signals which are said operating signals which can be used for learning; and
   a correcting unit configured to correct said input signals based on said correction norm obtained from said learning and outputting signals following the correction as said output signals to control the output device to perform said predetermined function,
   wherein, when the operating unit is operated for a predetermined amount of time or longer and then the operating is stopped, the judging unit judges the operating signals at the time of stopping to be learning operating signals.

2. A signal processing device according to claim 1, wherein said judging unit judges that, in the event that operations by a user continue for a predetermined time or longer following which the operations are stopped, said operating signals at the time of stopping are learning operating signals.

3. A signal processing device according to claim 1, wherein said learning unit learns said correction norm, according to said input signals at the point that said learning operating signals are supplied.

4. A signal processing device according to claim 3, wherein said correcting unit corrects said input signals based on said correction norm corresponding to the input signals.

5. A signal processing device according to claim 1, said learning unit comprising:
   a learning data generating unit configured to generate learning data used for said learning, based on said learning operating signals; and
   a correction norm generating unit configured to generate said correction norm, based on new learning information generated from said learning data and learning information obtained by learning heretofore.

6. A signal processing device according to claim 5, further comprising:
   a learning data storing unit configured to store a predetermined number of newest sets of said learning data;
   a learning information storing unit configured to store said learning information; and a correction norm judging unit configured to judge the properness of said correction norm obtained by said correction norm generating unit;
   wherein, in the event of judging that said correction norm obtained using said learning data and learning information is not proper, said correction norm generating unit obtains said correction norm again using only a predetermined number of newest sets of said learning data, and updates the stored contents of said learning information storing unit with new learning information obtained upon obtaining the correction norm.

7. A signal processing device according to claim 5, wherein said learning data generating unit generates said learning data from one or more of said learning operating signals, said input signals at the time of said learning operating signals being obtained, and said output signals.

8. A signal processing device according to claim 5, wherein said correcting unit corrects current input signals by weighting addition of current input signals and past output signals; and
   wherein said operating signals are signals representing weighting coefficients used for said weighting addition, and
   wherein said learning data generating unit takes as said learning data said weighting coefficients represented by said learning operating signals, and said weighting coefficients obtained from input reliability which is the reliability of said input signals at the time that said learning operating signals are input and output reliability which is the reliability of said output signals.

9. A signal processing device according to claim 5, wherein said correcting unit corrects said current input signals by weighting addition of current input signals and past output signals; and wherein said operating signals are signals representing weighting coefficients used for said weighting addition; and wherein said learning data generating unit takes as said learning data said weighting coefficients represented by said learning operating signals, and said weighting coefficients obtained from a plurality of said input signals in a predetermined relation with said input signals input at the time of input of said learning operating signals and output reliability which is the reliability of said output signals.

10. A signal processing device according to claim 5, wherein said correcting unit corrects said current input signals by weighting addition of current input signals and past output signals;

and wherein said learning data generating unit takes as said learning data weighting coefficients used for said weighting addition at the time of input of said learning operating signals, and said weighting coefficients obtained from said input signals input immediately prior to input of said learning operating signals.

11. A signal processing device according to claim 5, wherein said correcting unit corrects said current input signals by linear coupling of said current input signals and predetermined correction amount obtained from predetermined parameters; and wherein said learning data generating unit takes as said learning data said input signals immediately after input of said learning operating signals, and said input signals input immediately prior to input of said learning operating signals.

12. A signal processing device according to claim 1, further comprising:

an input reliability calculating unit configured to calculate input reliability which is the reliability of said input signals;

an output reliability calculating unit configured to calculate output reliability which is the reliability of said output signals; and a weighting computation unit configured to calculate weighting coefficients used for corrections of said input signals, based on said input reliability and output reliability;

wherein said correcting unit corrects said input signals using said weighting coefficients.

13. A signal processing device according to claim 12, said correcting unit comprising:

an output signals storing unit configured to store said output signals; and an adding unit configured to perform weighting addition using said weighting coefficients, with said input signals, and output signals stored in said output signal storing unit, as the object thereof.

14. A signal processing device according to claim 12, said learning unit comprising:

a tutor data generating unit configured to generate said weighting coefficients corresponding to said learning operating signals, as tutor data serving as a tutor for said learning;

a student data generating unit configured to generate said weighting coefficients used for correction of said input signals at the time of obtaining said learning operating signals, as student data serving as a student for said learning;

a control data computing unit configured to compute said control data to minimize a statistical error between said weighting coefficients obtained from control data for controlling said weighting coefficients and said student data, and said tutor data; and a weighting processing unit configured to process weighting coefficients obtained by said weighting computing unit, based on said control data, and ultimately obtaining weighting coefficients used for correcting said input signals.

15. A signal processing device according to claim 12, said learning unit comprising:

a tutor data generating unit configured to generate said weighting coefficients corresponding to said learning operating signals, as tutor data serving as a tutor for said learning;

a student data generating unit configured to obtain input signals in a predetermined relation with said input signals input at the time of obtaining said learning operating signals, as student data serving as a student for said learning; and a control data computing unit configured to compute said control data to minimize a statistical error between said weighting coefficients obtained from control data for controlling said input reliability and said student data calculated based on said input reliability, and said tutor data;

wherein said input reliability calculating unit calculates said input reliability based on said input signals and control data.

16. A signal processing device according to claim 12, wherein said weighting computing unit calculates input reliability which is the reliability of said input signals, based on said input signals, and obtain said weighting coefficients based on the input reliability.

17. A signal processing device according to claim 16, wherein said weighting computing unit obtains said input reliability based on dispersion of said input signals.

18. A signal processing device according to claim 16, wherein said weighting computing unit further calculates output reliability which is the reliability of said output signals, and obtain said weighting coefficients based on said input reliability and output reliability.

19. A signal processing device according to claim 18, wherein said weighting computing unit obtains said output reliability based on said input reliability.

20. A signal processing device according to claim 1, said learning unit comprising:

a tutor data generating unit configured to obtain said input signals input immediately following said learning operating signals being obtained, as tutor data serving as a tutor for said learning;

a student data generating unit configured to obtain said input signals input immediately prior to said learning operating signals being obtained, as student data serving as a student for said learning; and a control data computing unit configured to compute correction parameters to minimize a statistical error between signals obtained from correction parameters for controlling the amount of correction for correcting said input signals and said student data, and said tutor data;

wherein said correcting unit obtains said amount of correction from said correction parameters, and correct said input signals according to the correction amount.

21. A signal processing device according to claim 1, wherein said input signals are image signals or audio signals.

22. A signal processing device according to claim 1, wherein said input signals are signals representing the location or direction of movement of a moving object.

23. A signal processing method of correcting input signals and outputting output signals in a signal processing device to control an output device to perform a predetermined function, said method comprising:

provide operating signals according to user operations;

monitoring the operating signals and judging whether or not the operating signals are usable for learning;

learning a correction norm which is a norm for correcting said input signals, based on learning operating signals which are said operating signals which can be used for learning; and correcting said input signals based on said correction norm obtained from said learning and outputting signals following the correction as said output signals to control the output device to perform said predetermined function, wherein, when the operating signals are provided for a predetermined amount of time or longer and then the operating is stopped, the operating signals at the time of stopping judged to be learning operating signals.

24. A computer-readable medium storing a computer program for causing a computer to perform signal processing for correcting input signals and outputting output signals to control an output device to perform a predetermined function, said program comprising:

providing operating signals according to user operations;

monitoring the operating signals and judging whether or not the operating signals are usable for learning;

learning a correction norm which is a norm for correcting said input signals, based on learning operating signals which are said operating signals which can be used for learning; and correcting said input signals based on said correction norm obtained from said learning and outputting signals following the correction as said output signals to control the output device to perform said predetermined function, wherein in the event that operations by a user continue for a predetermined time or longer following which the operations are stopped, said operating signals at the time of stopping are learning operating signals.

25. A signal processing method to control an output device to perform a predetermined function, comprising:

receiving one or more operating signals at a device;

learning desired user outcomes from one or more of the operating signals;

generating correction norms based upon the desired user outcomes;

receiving an input signal;

modifying the input signal with the correction norm; and outputting the modified input signal to control the output device to perform said predetermined function, wherein the device selects operating signals that are suitable for generating correction norms from the one or more operating signals and uses the selected operating signals for generating the correction norms.

* * * * *